US011500658B2

(12) United States Patent
Dar

(10) Patent No.: US 11,500,658 B2
(45) Date of Patent: Nov. 15, 2022

(54) SYSTEMS AND METHODS FOR USING A TRANSACTION DATA STRUCTURE FOR CONFIGURING AND PROVIDING GRAPHICAL USER INTERFACES

(71) Applicant: Visionworks of America, Inc., San Antonio, TX (US)

(72) Inventor: Murad Dar, San Antonio, TX (US)

(73) Assignee: Visionworks of America, Inc., San Antonio, TX (US)

( * ) Notice: Subject to any disclaimer, the term of this patent is extended or adjusted under 35 U.S.C. 154(b) by 0 days.

(21) Appl. No.: 17/712,402

(22) Filed: Apr. 4, 2022

(65) Prior Publication Data
US 2022/0326968 A1  Oct. 13, 2022

Related U.S. Application Data

(63) Continuation-in-part of application No. 17/108,106, filed on Dec. 1, 2020.

(60) Provisional application No. 63/069,257, filed on Aug. 24, 2020.

(51) Int. Cl.
*G06F 3/0482* (2013.01)
*G06F 9/451* (2018.01)

(52) U.S. Cl.
CPC ............ *G06F 9/451* (2018.02); *G06F 3/0482* (2013.01)

(58) Field of Classification Search
CPC .............................................. G06F 3/048–05
See application file for complete search history.

(56) References Cited

U.S. PATENT DOCUMENTS

| 9,842,370 B1* | 12/2017 | Ingles ................. G06Q 40/08 |
| 10,459,256 B2 | 10/2019 | Fonte et al. |
| 2012/0016763 A1* | 1/2012 | Kirschner .............. A61B 3/152 351/204 |
| 2014/0095335 A1 | 4/2014 | Grosz |
| 2014/0180874 A1 | 6/2014 | Zhao |
| 2014/0257839 A1* | 9/2014 | Suter ..................... G06Q 10/10 705/2 |

(Continued)

OTHER PUBLICATIONS

Final Office Action, dated Nov. 3, 2021, from corresponding U.S. Appl. No. 17/108,106.

(Continued)

*Primary Examiner* — Daniel Rodriguez
(74) *Attorney, Agent, or Firm* — Brient IP Law, LLC

(57) ABSTRACT

Systems and methods for organizing and inter-relating data that is used in generating graphical user interfaces through the use of a novel data structure. For instance, various embodiments of the disclosure provide a method comprising: receiving data inputs provided by a website visitor on a first webpage of a website or an object comprising a first component; retrieving, based on the inputs, first source data from at least one data source that is associated with the first component; identifying, based on the first source data, a set of first options for the first component; generating a transaction data structure by populating first fields of the transaction data structure with the set of first object options; and upon generating the transaction data structure: generating, based on the first fields of the transaction data structure, a second webpage comprising at least one first selectable control providing the set of first options.

20 Claims, 10 Drawing Sheets

(56) References Cited

U.S. PATENT DOCUMENTS

| | | | |
|---|---|---|---|
| 2015/0154679 A1* | 6/2015 | Fonte | A61B 3/111 |
| | | | 703/1 |
| 2020/0183553 A1* | 6/2020 | Al-Sallami | G06F 40/186 |
| 2020/0394052 A1* | 12/2020 | Cheng | G06F 3/0482 |

OTHER PUBLICATIONS

Office Action, dated Jun. 22, 2022, from corresponding U.S. Appl. No. 17/108,106.

Office Action, dated May 28, 2021, from corresponding U.S. Appl. No. 17/108,106.

Restriction Requirement, dated Feb. 24, 2021, from corresponding U.S. Appl. No. 17/108,106.

\* cited by examiner

SUMMARY

Pair 1

MATERIALS CO-PAY
$25

PROGRESSIVE PREMIUM
$334 $239 edit

SMART SCREEN
$67 $0 edit

TIER 4 FRAMES
$232 $138 edit

| LIST PRICE | THE WORKS | YOU PAY |
|---|---|---|
| $733 | $440 | $402 |

+ADD ANOTHER PAIR

CONGRATULATIONS!
You have saved
$331
using your VSP benefits!

VSP.

Store: 145

EYE MASTERS
by Visionworks

JOHN SMITH
VSP NET CENTURY LINK | 16656

RETAIL  $733
SAVINGS  $331
Lenses    You Saved $95
Your max savings $114
Frames    You Saved $194
Your max savings $194
YOU PAY  $402

Calculate Benefits
○ Lenses
◯◯ Frames
▣ Summary
⊕ New Plan

CLOSE SALE

FIG. 10

SYSTEMS AND METHODS FOR USING A TRANSACTION DATA STRUCTURE FOR CONFIGURING AND PROVIDING GRAPHICAL USER INTERFACES

CROSS-REFERENCE TO RELATED APPLICATIONS

This application is a continuation-in-part of U.S. patent application Ser. No. 17/108,106, filed Dec. 1, 2020, entitled "Data Processing Systems and Methods for Calculating Cost and Benefit Parameters," which claims the benefit of U.S. Provisional Patent Application Ser. No. 63/069,257, filed Aug. 24, 2020, entitled "Data Processing Systems and Methods for Calculating Cost and Benefit Parameters."

TECHNICAL FIELD

The present disclosure is generally related to data processing systems and methods for organizing and inter-relating data that is used in generating graphical user interfaces through the use of a novel data structure for organizing and inter-relating the data that is employed in generating the graphical user interfaces.

BACKGROUND

Electronic commerce is facilitated through the use of websites that are visited by individuals who are interested in purchasing products through the websites (e.g., through the webpages provided by the websites). Computing systems used in supporting websites often generate webpages for these websites to display various information on the products that can be purchased through the websites. In addition, these systems generate webpages that are often configured with various selectable controls for selecting the products to purchase, as well as options available for the products. Accordingly, a system supporting a website is often tasked with generating webpages for the website with selectable controls that provide options that are typically subject to a single factor, such as a previous selection of another option, and not necessarily multiple factors.

However, a significant technical challenge that is often encountered by a computing system supporting a website is generating webpages for the website that are conditional on complexities that are introduced due to configuring options for various selectable controls on the webpages that are subject to multiple factors. This can prove an even more significant technical challenge due to the fact that a computing system is often required to generate such webpages on-the-fly as a visitor interacts with the website. Adding to the complexity of this technical challenge is the fact that multiple factors influencing the options that are made available for a particular selectable control can be subject to data (information) originating from multiple data sources.

SUMMARY

In general, various embodiments of the present invention provide methods, apparatuses, systems, computing devices, computing entities, and/or the like for organizing and inter-relating data that is used in generating graphical user interfaces through the use of a novel data structure. In various embodiments, a method is provided. Accordingly, the method comprises: receiving, by one or more computer processors, one or more data inputs provided by a website visitor on a first webpage of a website, wherein the website provides an object comprising a first component and a second component; retrieving, by the one or more computer processors and based at least in part on the one or more data inputs, source data for a benefit option applicable to the website visitor, wherein the source data comprises a benefit value for the website visitor; retrieving, by the one or more computer processors and based at least in part on the one or more data inputs, first object source data and second object source data from at least one data source, wherein the first object source data is associated with the first component and the second object source data is associated with the second component; identifying, by the one or more computer processors and based at least in part on the first object source data, a set of first object options for the first component; generating, by the one or more computer processors, a transaction data structure for the website visitor, wherein generating the transaction data structure comprises: populating a first data state field in the transaction data structure with the benefit value; and populating one or more first fields of the transaction data structure with the set of first object options; generating, by the one or more computer processors and based at least in part on the first data state field and the one or more first fields of the transaction data structure, a second webpage comprising at least one first selectable control providing the set of first object options; providing, by the one or more computer processors, the second webpage for display to the website visitor through the website; receiving, by the one or more computer processors and originating from the at least one first selectable control, a first selection of a particular first object option of the set of first object options; and responsive to receiving the first selection: generating, by the one or more computer processors and based at least in part on the first selection, a revised benefit value for the website visitor; updating, by the one or more computer processors, the first data state field of the transaction data structure to reflect the revised benefit value for the website visitor; populating, by the one or more computer processors, a second data state field of the transaction data structure with the first selection; identifying, by the one or more computer processors and based at least in part on the second object source data, the revised benefit value, and the second data state field, a set of second object options for the second component; populating, by the one or more computer processors, one or more second fields of the transaction data structure with the set of second object options; generating, by the one or more computer processors and based at least in part on the one or more second fields of the transaction data structure, a third webpage comprising at least one second selectable control providing the set of second object options; and providing, by the one or more computer processors, the third webpage for display to the website visitor through the website.

In various embodiments, a system is provided that comprises a non-transitory computer-readable medium storing instructions and a processing device communicatively coupled to the non-transitory computer-readable medium. The processing device is configured to execute the instructions and thereby perform operations comprising: receiving one or more data inputs provided by a website visitor on a first webpage of a website, wherein the website provides an object comprising a first component and a second component; retrieving, based at least in part on the one or more data inputs, source data for a benefit option applicable to the website visitor, wherein the source data comprises a benefit value for the website visitor; retrieving, based at least in part on the one or more data inputs, first object source data and second object source data from at least one data source, wherein the first object source data is associated with the first component and the second object source data is associated with the second component; identifying, based at least in part on the first object source data, a set of first object options for the first component; generating a transaction data structure for the website visitor, wherein generating the transaction data structure comprises: populating a first data state field in the transaction data structure with the benefit value; and populating one or more first fields of the transaction data structure with the set of first object options; generating, based at least in part on the first data state field and the one or more first fields of the transaction data structure, a second webpage comprising at least one first selectable control providing the set of first object options; providing the second webpage for display to the website visitor through the website; receiving, originating from the at least one first selectable control, a first selection of a particular first object option of the set of first object options; and responsive to receiving the first selection: generating, based at least in part on the first selection, a revised benefit value for the website visitor; updating the first data state field of the transaction data structure to reflect the revised benefit value for the website visitor; populating a second data state field of the transaction data structure with the first selection; identifying, based at least in part on the second object source data, the revised benefit value, and the second data state field, a set of second object options for the second component; populating one or more second fields of the transaction data structure with the set of second object options; generating, based at least in part on the one or more second fields of the transaction data structure, a third webpage comprising at least one second selectable control providing the set of second object options; and providing the third webpage for display to the website visitor through the website.

In various embodiments, a non-transitory computer-readable medium having program code that is stored thereon is provided. The program code is executable by one or more processing devices for performing operations comprising: receiving one or more data inputs provided by a website visitor on a first webpage of a website, wherein the website provides an object comprising a first component and a second component; retrieving, based at least in part on the one or more data inputs, source data for a benefit option applicable to the website visitor, wherein the source data comprises a benefit value for the website visitor; retrieving, based at least in part on the one or more data inputs, first object source data and second object source data from at least one data source, wherein the first object source data is associated with the first component and the second object source data is associated with the second component; identifying, based at least in part on the first object source data, a set of first object options for the first component; generating a transaction data structure for the website visitor, wherein generating the transaction data structure comprises: populating a first data state field in the transaction data structure with the benefit value; and populating one or more first fields of the transaction data structure with the set of first object options; generating, based at least in part on the first data state field and the one or more first fields of the transaction data structure, a second webpage comprising at least one first selectable control providing the set of first object options; providing the second webpage for display to the website visitor through the website; receiving, originating from the at least one first selectable control, a first selection of a particular first object option of the set of first object options; and responsive to receiving the first selection: generating, based at least in part on the first selection, a revised benefit value for the website visitor; updating the first data state field of the transaction data structure to reflect the revised benefit value for the website visitor; populating a second data state field of the transaction data structure with the first selection; identifying, based at least in part on the second object source data, the revised benefit value, and the second data state field, a set of second object options for the second component; populating one or more second fields of the transaction data structure with the set of second object options; generating, based at least in part on the one or more second fields of the transaction data structure, a third webpage comprising at least one second selectable control providing the set of second object options; and providing the third webpage for display to the website visitor through the website.

BRIEF DESCRIPTION OF THE DRAWINGS

Various embodiments of the invention will be described below. In the course of the description, reference will be made to the accompanying drawings, which are not necessarily drawn to scale, and wherein:

FIG. 7 is another example of a GUI that may be configured and generated based at least in part on a transaction data structure according to various embodiments.

FIG. 9 is another example of a GUI that may be configured and generated based at least in part on a transaction data structure according to various embodiments.

FIG. 10 is another example of a GUI that may be configured and generated based at least in part on a transaction data structure according to various embodiments.

DETAILED DESCRIPTION

Figure 1:
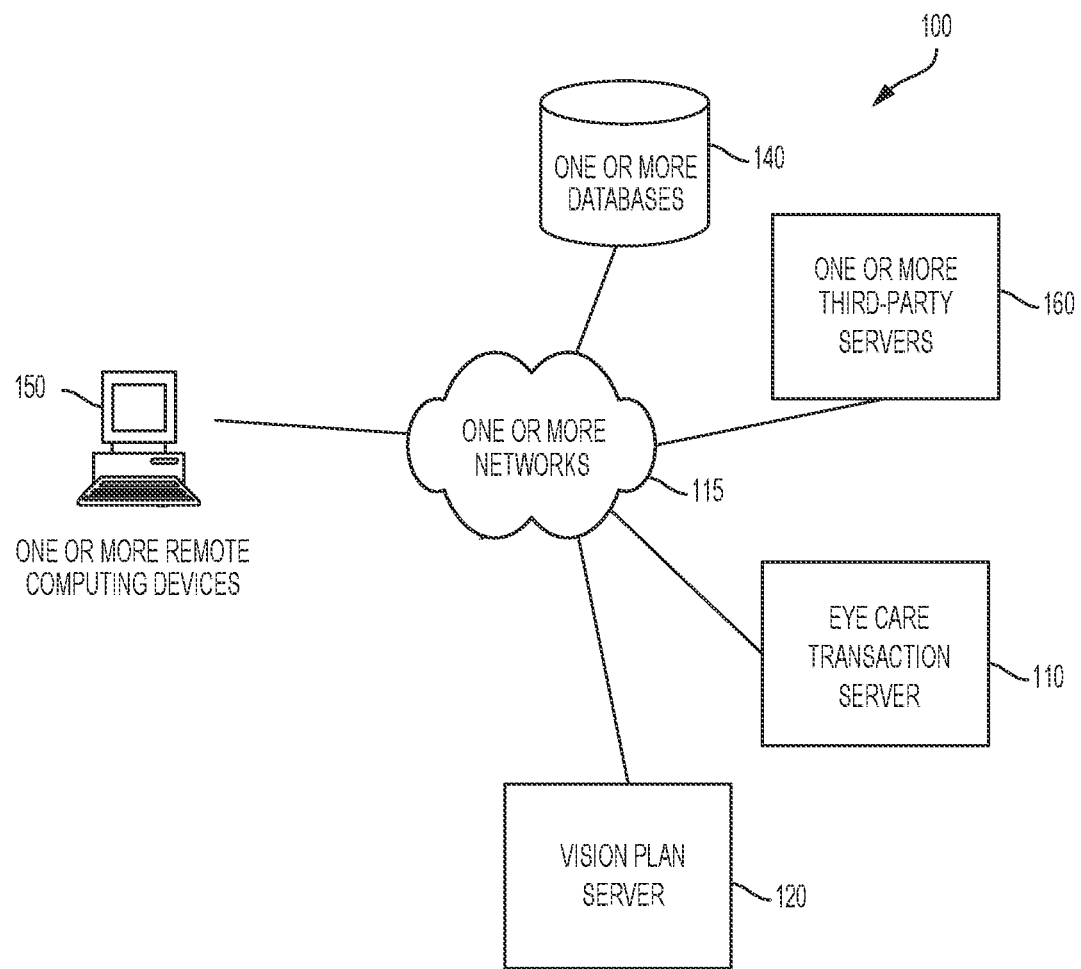
FIG. 1 is a schematic diagram of a Graphical User Interface (GUI) Provider System for using a transaction data structure in configuring and providing graphical user interfaces according to various embodiments.

Various embodiments will now be described in greater detail. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Overview and Technical Contributions Provided by Various Embodiments

Electronic commerce is facilitated through the use of websites that are visited by individuals who are interested in purchasing products through the websites (e.g., through the webpages provided by the websites). Computing systems (also referred to "systems") used in supporting websites often generate webpages for these websites to display various information on the products that can be purchased through the websites. Accordingly, such information can be helpful to visitors to the websites in deciding which of the products he or she would like to purchase. In addition, these systems generate webpages that are often configured with various selectable controls for selecting the products to purchase, as well as options available for the products. For example, a webpage may provide one or more selectable controls such as buttons, DropDownLists, Checkboxes, ListBoxes, ListViews, and/or the like that can be used for displaying options to a visitor and allowing the visitor to select one or more desired options.

For example, a clothing company may provide a website through which customers (e.g., visitors) can purchase clothing products from the company. Here, the system that supports the website may generate webpages for the website that display the various clothing items for sale by the clothing company. The webpages may be configured with selectable controls (e.g., buttons) that allow for a visitor to select a particular clothing item for purchase. In addition, the system may generate the webpages with addition selectable controls to identify options for a selected clothing item such as a dropdown menu having sizing options for the selected clothing item. Often, a product sold through a website is the same, regardless of the visitor to the website. Therefore, although the system may generate a webpage configured with a selectable control that can provide different options, such options are typically the same for each visitor to the website.

For example, a custom bicycle builder may have a website through which visitors can order to have a custom bicycle built and pay for the bicycle. Here, a system supporting the website can generate various webpages configured with selectable controls that provide visitors with various options with respect to different components of the bicycle. For example, the system may support the website by generating a webpage with different options for drivetrain groupsets that the visitor can select to have installed on the bicycle. The webpage may be configured with various selectable controls that facilitate a visitor selecting the desired groupset. Some of the selectable controls may provide options that are subject to a previous option selected by the visitor. For example, the webpage may provide a first selectable control (e.g., a first DropDownList) that allows the visitor to select a brand for the groupset (e.g., Shimano, SRAM, or Campagnolo) The webpage may provide a second selectable control (e.g., a second DropDownList) that allows the visitor to then select the particular groupset found within the selected brand. For example, the second selectable control may provide the options of Dura-Ace, Ultegra, 105, and Tiagra groupsets as a result of the visitor selecting the Shimano brand. Therefore, the system configures the options provided by the second selectable control subject to the visitor's selection of the options for the first selectable control.

Accordingly, a system supporting a website is often tasked with generating webpages for the website with selectable controls that provide options that are typically subject to a single factor, such as a previous selection of another option, and not multiple factors. In other words, a system supporting a website is often tasked with generating webpages for the website through which visitors are selecting various options that are not conditional on complexities introduced by having options being made available based at least in part on multiple factors. However, that is not always the case for all e-commerce websites.

For instance, the options provided for particular selectable controls on webpages of some websites can be subject to, not only previous options selected by a visitor, but on another factor such as the specific visitor who is visiting the website. For example, an e-commerce website may involve the selling of vision-related products such as eyeglasses and contact lenses ("contacts). Here, the system supporting the website may generate webpages for the website that involve selectable controls that provide options to a visitor of the website that are not only subject to previous options selected by the visitor, but are also subject to the visitor's vision plan and what his or her vision plan covers with respect to the cost of purchasing vision-related products. Thus, a significant technical challenge that is often encountered by a system supporting a website is generating webpages for the website that are conditional on complexities that are introduced due to configuring options for various selectable controls on the webpages that are subject to multiple factors. This can prove an even more significant technical challenge in the fact that a system is often required to generate such webpages on-the-fly as a visitor interacts with the website.

Adding to the complexity of this technical challenge is the fact that multiple factors influencing the options that are made available for a particular selectable control can be subject to data (information) originating from multiple data sources. For example, the system supporting the e-commerce website selling vision-related products may be required to generate webpages having vision-related product options that are available through several different suppliers and/or manufacturers. In addition, the vision-related product options may be subject to a visitor's vision plan, which may be one of many different plans provided from one of several different vision plan providers. Therefore, the system may be required to consider data from data sources for the several different suppliers and/or manufacturers, as well as data sources for the different vision plan providers, in generating any one set of options provided for a selectable control on a particular webpage of the website.

In some instances, the system is required to query the necessary data needed to generate the set of options from the data sources for the different suppliers and/or manufacturers and/or the different vision plan providers. This can prove to be quite cumbersome and result in poor (e.g., too slow) performance of the system in generating various webpages for the website. In other instances, the system may store the data from the data sources for the different suppliers and/or manufacturers and/or the different vision plan providers locally within one or more repositories that are accessible to the system. But again, due to the fact that multiple factors are influencing the options that are made available for a particular selectable control, this can prove to be quite cumbersome and result in poor (e.g., too slow) performance of the system in generating various webpages for the website.

Another technical challenge encountered by systems supporting websites is in generating webpages with selectable controls having options that are subject to multiple factors is the dynamic nature of the combination of factors that may exist at any given time while a visitor is interacting with the website. For example, a system supporting a website may be tasked with generating a webpage for the website in which the webpage includes a selectable control that provides options that are subject to multiple factors. As a specific example, the system may be supporting the e-commerce website selling vision-related products. The computing system may be generating a particular webpage that includes a selectable control providing options on lenses to include in a pair of prescription glasses.

Here, the options for the lenses may be subject to the type of frame the visitor has already selected for the glasses, as well as an amount of benefit the visitor still has available through his or her vision plan in light of the other options the visitor has already selected for the glasses. Therefore, the system is required to evaluate a data state of a selectable control that is used in selecting the frame for the glasses and a data state of the amount of benefit the visitor has left under the visitor's vision plan in generating the lens options for the selectable control. In evaluating these data states, the computing system may be required to evaluate the selectable control used in selecting the frame to determine if an option has been selected, as well as track the amount of benefit the visitor has remaining, all of which can amount to computation overhead the system is required to perform. Therefore, the system having to track and evaluate these various data states can lead to computational inefficiencies that result in poor (e.g., too slow) performance of the system in generating the options for the selectable control.

Accordingly, various embodiments of the disclosure overcome the technical challenges as detailed above. Specifically, various embodiments of the disclosure provide a system for generating webpages for a website that involves employing a novel transaction data structure that is used as a common source for data that influences the options provided on the webpages for various selectable controls. According to various embodiments, the system employs the transaction data structure for storing data related to multiple factors that influence the options provided for various selectable controls. The system can then use the transaction data structure to efficiently and effectively determine what different options to provide for selectable controls displayed on various webpages of the website as visitors to the website conduct transactions on the website.

According to particular embodiments, the transaction data structure can be used in organizing and storing data for the multiple factors that are inter-related with respect to their combined influence on what options are to be provided for the various selectable controls. As a result, the transaction data structure addresses the technical challenges encountered by the system of generating webpages with selectable controls in which the options provided for the controls are subject to multiple factors having data (information) originating from multiple data sources.

In addition, the system can use the transaction data structure to address the technical challenges involving the dynamic nature of the combination of factors that influence the options provided for various selectable controls that may exist at any given time while a visitor is conducting a transaction on the website. In various embodiments, the transaction data structure is configured to represent various states of the website as a visitor conducts a transaction through the website. Here, the transaction data structure can include data on various states of the website that represent the options that are available for various selectable controls that are currently displayed on webpages for the website, as well as what specific options are currently selected for the different selectable controls.

In addition, the transaction data structure can include data on other states associated with the website such as, for example, a current accounting of the use and availability of benefits provided to a visitor to the website. Therefore, in various embodiments, the system can utilize the state data provided by the transaction data structure during the generating of webpages in further determining what options to provide for various selectable controls displayed on the webpages. As a result, the transaction data structure addresses the technical challenges encountered by the system of generating webpages with selectable controls having options that are subject to combinations of multiple factors that are dynamic in nature in that any combination of multiple factors can exist at any given time while a visitor is conducting a transaction on the website.

It is noted that the remainder of the disclosure discusses various embodiments of the disclosure with respect to configuring and generating webpages used for websites. However, the technical challenges described herein can also be applicable to configuring and generating other types of graphical user interfaces in addition to webpages such as, for example, screens that are used in software applications such as mobile applications designed for use on mobile computing devices. Therefore, various embodiments of the disclosure can also, or instead, be applicable for configuring and generating other types of graphical user interfaces. As such, discussion of the various embodiments of the disclosure in conjunction with configuring and generating webpages for websites should not be viewed as limiting the scope of the disclosure. Further detail is now provided on various embodiments of the disclosure.

Exemplary Technical Platforms

As will be appreciated by one skilled in the relevant field, the present systems may be, for example, embodied as a computing system, a method, or a computer program product. Accordingly, various embodiments may take the form of an entirely hardware embodiment, an entirely software embodiment, or an embodiment combining software and hardware aspects. Furthermore, particular embodiments may take the form of a computer program product stored on a computer-readable storage medium having computer-readable instructions (e.g., software) embodied in the storage medium. Various embodiments may take the form of web-implemented computer software. Any suitable computer-readable storage medium may be utilized including, for example, hard disks, compact disks, DVDs, optical storage devices, and/or magnetic storage devices.

Various embodiments are described below with reference to block diagrams and flowchart illustrations of methods, apparatuses (e.g., devices, systems), and computer program products. It should be understood that each block of the block diagrams and flowchart illustrations, and combinations of blocks in the block diagrams and flowchart illustrations, respectively, can be implemented by a computer executing computer program instructions. These computer program instructions may be loaded onto a general purpose computer, special purpose computer, or other programmable data processing apparatus to produce a machine, such that the instructions which execute on the computer or other programmable data processing apparatus to create means for implementing the functions specified in the flowchart block or blocks.

These computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of mechanisms for performing the specified functions, combinations of steps for performing the specified functions, and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and other hardware executing appropriate computer instructions.

Exemplary System Architecture

FIG. 1 is a block diagram of a Graphical User Interface (GUI) Provider System 100 used in implementing various aspects of the disclosure according to a particular embodiment. Accordingly, the GUI Provider System 100 can be used in supporting various types of GUIs for different applications. However, with that said, an example is used throughout the disclosure to aid in the reader's understanding of various embodiments of the disclosure. In the example, the GUI Provider System 100 supports GUIs that are provided via a website visited by individuals who wish to make a vision-related product and/or service purchase such as the purchase of eyeglasses, contacts, vision testing, and/or the like. The website guides an individual through the selection and purchasing process (e.g., transaction) for a vision-related product and/or service that can be purchased through the website. Accordingly, the GUI Provider System 100 generates various webpages for the website that are configured with selectable controls providing a visitor to the website with various options related to the purchasing of a vision-related product and/or service. For example, a particular webpage may provide the visitor with one or more selectable controls that allow for the visitor to select a type of frame for eyeglasses.

In addition, the GUI Provider System 100 may generate the various webpages to provide current vision plan information to the visitor as the visitor is guided through the selection and purchasing process for the vision-related product or service. For example, the vision plan information may be based at least in part on the visitor's personal vision plan and the GUI Provider System 100 may track the visitor's use of benefits through his or her plan. Further, the GUI Provider System 100 may identify available options for selectable controls based at least in part on the benefits still available to the visitor as the visitor makes selections using the selectable controls as he or she is guided through the selection and purchasing process for the vision-related product or service. Therefore, the GUI Provider System's 100 generation of webpages for the website is conditional on complexities that are introduced due to the configurations of options for the various selectable controls provided on the webpages that are subject to multiple factors that involve the visitor's selections of various options, as well as the benefits available to the visitor under his or her vision plan.

As may be understood from this figure, the GUI Provider System 100 for the example may include an Eye Care Transaction Server 110, a Vision Plan Server 120, one or more third-party servers 160, one or more networks 115, one or more remote computing devices 130 (e.g., such as a smart phone, a tablet computer, a wearable computing device, a laptop computer, a desktop computer, an eye care provider computer, a point-of-sale (POS) device, etc.), and one or more databases 140 (e.g., cloud storage). In particular embodiments, the one or more networks 115 facilitate communication between the one or more remote computing devices 150, the Eye Care Transaction Server 110, the Vision Plan Server 120, and/or the one or more databases 140. Any of the one or more databases 140 may be a data repository that captures and/or stores source data that may be used to determine vision plan benefits, costs, discounts, various components of vision-related products and/or services, etc. In addition, or instead, any of the one or more databases 140 may be a data repository configured to capture, store, and/or determine criteria that may be used to determine options that can be provided for various selectable controls.

For instance, in some embodiments, the GUI Provider System 100 (e.g., the Vision Plan Server 120) may retrieve source data, routinely and/or in real time, on various vision plans provided through different vision plan providers, as well as the individuals who are enrolled in the plans. For example, the GUI Provider System 100 may use one or more application programming interfaces (APIs) in communicating with one or more third-party servers 160 associated with the vision plan providers over the one or more networks 115 in retrieving the source data. In addition, in some embodiments, the GUI Provider System 100 (e.g., the Vision Plan Server 120) may also, or instead, retrieve source data, routinely and/or in real time, on various vision-related products and services, and options thereof, provided through different vision-related product and service suppliers and/or manufacturers. For example, the GUI Provider System 100 may use one or more APIs in communicating with one or more third-party servers 160 associated with the vision-related product and service suppliers and/or manufacturers over the one or more networks 115 in retrieving the source data. Accordingly, in particular embodiments, the one or more databases 140 can serve as a centralized data repository for storing source data on various vision plans, individuals who are enrolled in such plans, vision-related products and services, and/or options provided for such products and services. Such a configuration can assist the GUI Provider System 100 in generating various webpages for the website in a more efficient manner by providing a single source of data that is used in identifying options for various selectable controls, as well as other information that may be used and/or displayed, in generating the webpages.

For example, in some embodiments, the Vision Plan Server 120 may organize the source data (e.g., the vision plan data and/or vision-related product and service data) in the one or more databases 140 using one or more suitable source data structures. Accordingly, the source data structures can format the data so that the data may be readily utilized by, for example, the Eye Care Transaction Server 110 in identifying options for various selectable controls in generating webpages as described herein. In some embodiments, the Vision Plan Server 120 may obtain the source data (e.g., the vison plan data and/or vision-related product and service data, or portion thereof) using data mining techniques. In some embodiments, the Vision Plan Server 120 may also, or instead, obtain such data, or portion thereof, in real-time. For example, the Vision Plan Server 120 may obtain an individual's vision plan data in real-time in response to a query from the Eye Care Transaction Server 110 to ensure that the Eye Care Transaction Server 110 uses the most up-to-date plan data in processing a transaction for the particular individual.

The one or more networks 115 may include any of a variety of types of wired or wireless computer networks, or any combination thereof, such as the Internet, a private intranet, a mesh network, a public switch telephone network (PSTN), or any other type of network (e.g., a network that uses Bluetooth or near field communications to facilitate communication between computing devices). The communication link between any of the components of the GUI Provider System 100, such as the one or more remote computing devices 150 and the Eye Care Transaction Server 110 may be, for example, implemented via a Local Area Network (LAN) or via the Internet.

Figure 2:
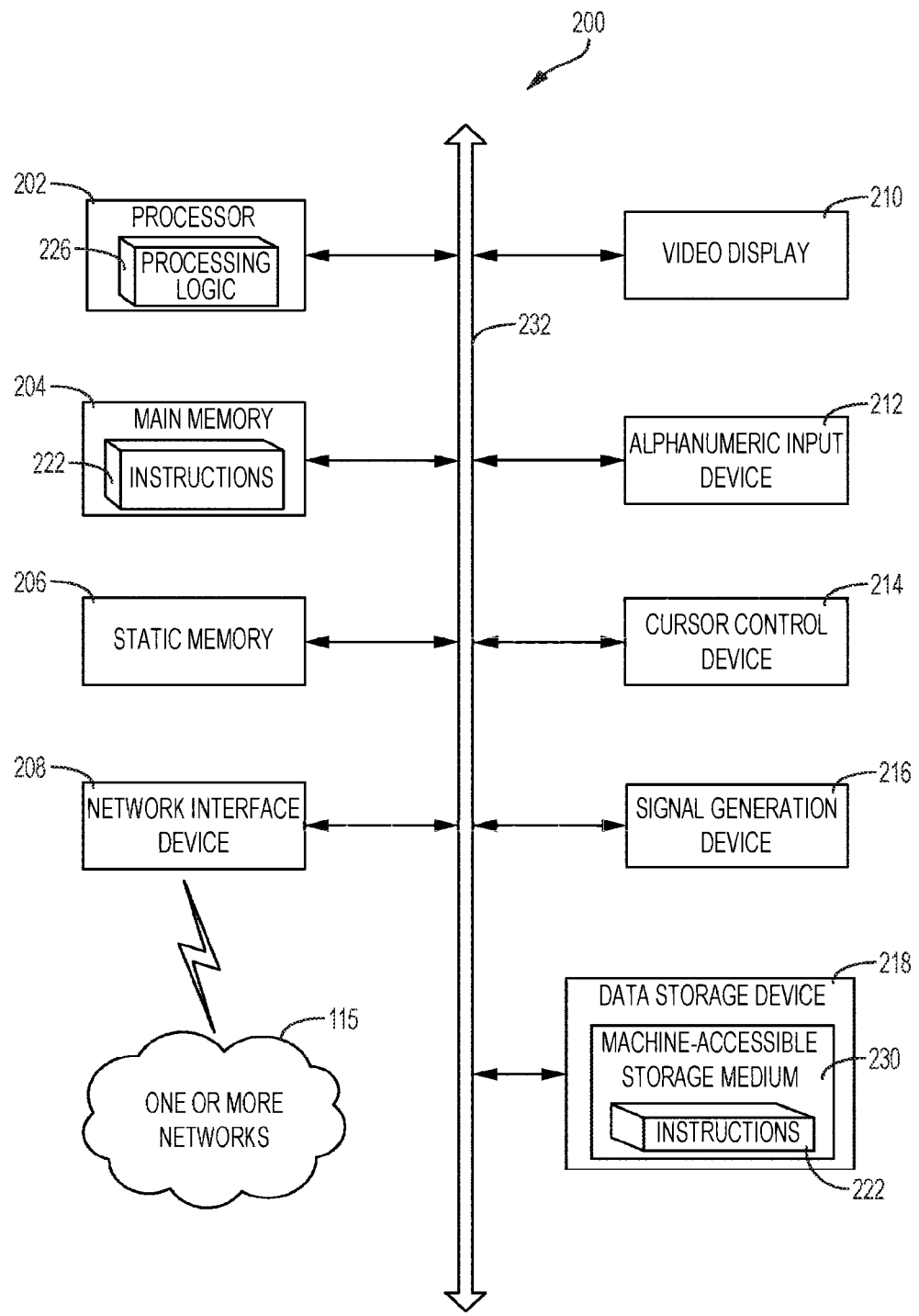
FIG. 2 is a schematic diagram of an exemplary computer that may be used in various embodiments, such as in one or more of the devices described in regard to the GUI Provider System shown in FIG. 1.

FIG. 2 illustrates a diagrammatic representation of a computing device 200 that can be used within the GUI Provider System 100, for example, as a server computer (e.g., the Eye Care Transaction Server 110 shown in FIG. 1) or as a client computer (e.g., one of the one or more remote computing devices 150 shown in FIG. 1). In particular embodiments, the computing device 200 may be connected (e.g., networked) to other computing devices via a LAN, an intranet, an extranet, and/or the Internet. As noted above, the computing device 200 may operate in the capacity of a server and/or a client computing device in a client-server network environment, and/or as a peer computing device in a peer-to-peer (or distributed) network environment. The computing device 200 may be a desktop personal computing device (PC), a tablet PC, a set-top box (STB), a Personal Digital Assistant (PDA), a cellular telephone, a web appliance, a server, a network router, a switch or bridge, or any other computing device capable of executing a set of instructions (sequential or otherwise) that specify actions to be taken by that computing device. Further, while only a single computing device is illustrated, the term "computing device" shall also be taken to include any collection of computing devices that individually or jointly execute a set (or multiple sets) of instructions to perform any one or more of the methodologies discussed herein.

Returning to FIG. 2, an exemplary computing device 200 includes a processing device 202, a main memory 204 (e.g., read-only memory (ROM), flash memory, dynamic random access memory (DRAM) such as synchronous DRAM (SDRAM) or Rambus DRAM (RDRAM), etc.), a static memory 206 (e.g., flash memory, static random access memory (SRAM), etc.), and a data storage device 218, which communicate with each other via a bus 232. The processing device 202 represents one or more general-purpose or specific processing devices such as a microprocessor, a central processing unit, or the like. More particularly, the processing device 202 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 202 may also be one or more special-purpose processing devices such as an application specific integrated circuit (ASIC), a field programmable gate array (FPGA), a digital signal processor (DSP), network processor, or the like. The processing device 202 may be configured to execute processing logic 226 for performing various operations and steps discussed herein.

The computing device 200 may further include a network interface device 208. The computing device 200 also may include a video display unit 210 (e.g., a liquid crystal display (LCD), a light-emitting diode (LED) display, an organic LED (OLED) display, a cathode ray tube (CRT), etc.), an alphanumeric input device 212 (e.g., a keyboard), a cursor control device 214 (e.g., a mouse), and a signal generation device 216 (e.g., a speaker).

The data storage device 218 may include a non-transitory computing device-accessible storage medium 230 (also known as a non-transitory computing device-readable storage medium or a non-transitory computer-readable medium) on which may be stored one or more sets of instructions (e.g., software 222) embodying any one or more of the methodologies or functions described herein. The software 222 may also reside, completely or at least partially, within the main memory 204 and/or within the processing device 202 during execution thereof by the computing device 200—the main memory 204 and the processing device 202 also constituting computing device-accessible storage media. The software 222 may further be transmitted or received over a network 115 via a network interface device 208.

While the computing device-accessible storage medium 230 is shown in an exemplary embodiment to be a single medium, the terms "computing device-accessible storage medium" and "computer-readable medium" should be understood to include a single medium or multiple media (e.g., a centralized or distributed database, and/or associated caches and servers) that store the one or more sets of instructions. The terms "computing device-accessible storage medium" and "computer-readable medium" should also be understood to include any device that is capable of storing, encoding, or carrying a set of instructions for execution by the computing device and that cause the computing device to perform any one or more of the methodologies of the present invention. The terms "computing device-accessible storage medium" and "computer-readable medium" should accordingly be understood to include, but not be limited to, solid-state memories, optical and magnetic media, etc.

"Big Data" Processing and Machining Learning for Processing Data

In various embodiments, and as described in further detail herein, the system may use "big data" techniques (e.g., machine learning techniques that, for example, use artificial intelligence to identify one or more patterns within a large set of data) to process certain types of data such as, for example, source data (e.g., vision plan data, vision-related product and service data, and/or participant data) that may have been previously stored to determine one or more options available for various selectable controls provided on generated webpages. The system may also use such techniques to determine one or more underutilized options and/or other friction points in configuring various selectable controls for webpages. For example, the system may use big data processing techniques to mine purchase process data previously stored for multiple past purchases of vision-related products and/or services to determine whether to adjust the various options made available to individuals for certain selectable controls displayed on webpages of a website to increase the effectiveness of the webpages in facilitating and/or improving the individuals' (e.g., visitors') experience in using the website. As another example, the system may use machine learning to analyze a large body of data regarding past purchases and the marketing associated with those past purchases to optimize the options made available to visitors for various selectable controls provided on webpages of a website. Again, use of such machine learning can increase the effectiveness of the webpages in facilitating and/or improving the individuals' experience in using the website.

In various embodiments, the system may use predictive analytics to determine preferred options, preferences, friction points, etc. For example, the system may utilize one or more of a variety of statistical techniques in conjunction with "big data" processing, including as described herein. In particular embodiments, the system may employ any one or more of a variety of statistical techniques in conjunction with data mining, predictive modeling, and/or machine learning (e.g., as described herein) to analyze current visitor information and/or historical visitor information to generate predictions regarding preferences and preferred or more appealing options to make available for various selectable controls provided on webpages as described herein. In particular embodiments, the system may employ machine learning in implementing the disclosed systems and methods to better determine appealing options and/or reduce friction and any of various points in providing functionality through various websites.

Transaction System Overview

In providing a website that can facilitate the purchase of a product or service such as, for example, a vision-related product and/or service, the system may gather source data that can be used in determining what options to make available for certain selectable controls, as well as other information, displayed on various webpages of the website. For example, referring again to FIG. 1, the Vision Plan Server 120 may acquire (e.g., query and/or receive) vision plan and/or vision-related product and/or service data from the One or More Third-Party Servers 160 and store such data for use as source data in determining options to make available for certain selectable controls during transactions involving visitors to the website who are purchasing a vision-related product and/or service on the website. In various embodiments, the Vision Plan Server 120 may perform data mining operations across multiple devices (represented as the One or More Third-Party Servers 160) that may store the vision plan and/or vision-related product and/or service data. In some embodiments, the Vision Plan Server 120 may organize the vision plan and/or vision-related product and/or service data collected across multiple devices into one or more source data structures. For example, each source data structure may represent a particular vision plan, type of vision plan, vision-related product component, vision-related service component, and/or the like that includes data representing one or more aspects of the respective vision plan, type of vision plan, vision-related product component, vision-related service component, and/ or the like (e.g., benefits, options, costs, participating component suppliers and/or manufacturers, participating eye care providers, plan identifying information, etc.).

As a specific example, the Vision Plan Server 120 may collect vision-related product data from Third-Party Servers 160 associated with different vision-related product suppliers and/or manufacturers. Here, the collected vision-related product data may include data on the frame component of eyewear. Specifically, the collected vision-related product data may include frame data on different types of frames provided through the different vision-related product suppliers and/or manufacturers. Therefore, the Vision Plan Server 120 may organize the frame data into a first source data structure that identifies the different types of frames that are available through the different vision-related product suppliers and/or manufacturers. In addition, the Vision Plan Server 120 may organize the frame data into the first source data structure to identify various information associated with each of the different types of frames such as the cost of each type of frame, the material used for constructing the type of frame, the particular supplier or manufacturer of the type of frame, the types of lenses that can be used with the type of frame, what vision plans can be used in purchasing the type of frame, and/or the like. Likewise, the Vision Plan Server 120 may organize data found in the vision-related product data on other components of eyewear into other source data structures such as, for example, organize data found in the vision-related product data on the lens component of eyewear into a second source data structure.

Accordingly, the system (e.g., the Eye Care Transaction Server 110) can use these source data structures during transactions conduced on the website in generating webpages for the website in that the data included in any one source data structure can be used in identifying what options can be made available for one or more particular selectable controls displayed on a webpage, as well as other information that can be displayed on the webpage. That is to say, in particular embodiments, the system can use a source data structure for a particular vision plan, type of vision plan, vision-related product component, vision-related service component, and/or the like to serve as a common source of data for the particular vision plan, type of vision plan, vision-related product component, vision-related service component, and/or the like in identifying what options can be made available for one or more particular selectable controls. As a result, these source data structures can enable the system to generate webpages for the website in a more efficient and effective manner. This is because in various embodiments, the system can use a source data structure for a particular vision plan, type of plan, vision-related product component, vision-related service component, and/or the like as a single source of data in identifying the options that can be made available for the particular vision plan, type of vision plan, vision-related product component, vision-related service component, and/or the like, although the data provided in the source data structure may have originated from multiple data sources (e.g., multiple Third Party Servers 160 for the different vision-related product suppliers and/or manufacturers).

In addition, in some embodiments, the Vision Plan Server 120 may create one or more transaction templates that can be used by the system (e.g., the Eye Care Transaction Server 110) in generating respective transaction data structures used for representing specific transactions being carried out on the website. For example, the system may use a template in generating a transaction data structure used in facilitating a particular transaction involving a visitor to the website purchasing a vision-related product or service. As described in more detail herein, the system uses the transaction data structure as a common source to store data that can influence the options provided for various selectable controls on one or more webpages. That is to say, in various embodiments, the system uses the transaction data structure to store data related to multiple factors that influence the options provided for the various selectable controls.

For example, the system may use the transaction data structure in storing available options data on the specific options that are made available for various selectable controls to be displayed on various webpages of the website during the transaction. In addition, the system may use the transaction data structure in storing data on various states of the website (e.g., state data) during the transaction that can influence the options provided for the various selectable controls. For example, the system may use the transaction data structure in storing state data on a specific option that has been selected for a first selectable control by the visitor during the transaction that influences the options provided for a second, different selectable control. Accordingly, in various embodiments, the system is able to use the transaction data structure as a common source for data that may influence the options provided for any particular selectable controls and in doing so, the system may be able to generate webpages for the website in a more efficient and effective manner.

When a particular visitor initiates a transaction on the website, the Eye Care Transaction Server 110 may generate and present an interface (e.g., a webpage) to collect information from the visitor that the system can then use to determine if the visitor is a participant in a vision plan. For example, the system may collect identifying information from the visitor such as name, phone number, employee number, employer, social security number, address, etc. and use the information to determine whether the visitor is an active plan participant by querying a server that may identify plan participants (e.g., the Vision Plan Server 120, the One or More Third-Party Servers 160, and/or the like). Instead, or in addition, the Eye Care Transaction Server 110 may generate and present an interface to collect information about a vision plan in which the visitor is a participant, such as the relevant plan name, plan number, group number, etc. The system may use this information to confirm that the visitor is an active plan participant, for example, by querying a server that may be configured to identify such plan participants (e.g., the Vision Plan Server 120, the One or More Third-Party Servers 160, and/or the like).

In response to determining that the visitor is a plan participant in a particular vision plan, the Eye Care Transaction Server 110 may determine various parameters associated with the particular plan and visitor. In some embodiments, the Eye Care Transaction Server 110 may query the Vision Plan Server 120. In turn, the Vision Plan Server 120 may retrieve a source data structure for the particular vision plan and retrieve parameters for the particular vision plan from the source data structure to provide to the Eye Care Transaction Server 110. In other embodiments, the Eye Care Transaction Server 110 may retrieve the source data structure directly and retrieve the parameters. Such parameters may include, for example, the services available (e.g., eye exam), the products available (e.g., eyeglasses, contact lenses), and the various options available under the plan to the visitor (e.g., particular types of tests available with the eye exam, particular lens types available, particular frame types available, etc.). Such parameters may also, or instead, include respective costs and/or coverage associated with any such services, products, and related options.

At this point, the Eye Care Transaction Server 110 in various embodiments may generate a transaction data structure for the particular transaction initiated by the visitor to store parameters associated with the visitor's vision plan. In some embodiments, the Eye Care Transaction Server 110 may use a transaction template in generating the transaction data structure. As further discussed herein, the system may update this transaction data structure during the transaction to maintain a record of the selections of various options related to purchasing the vision-related product or service by the visitor during the transaction, as well as state data related to the transaction and/or any other suitable data.

Accordingly, the Eye Care Transaction Server 110 may use the transaction data structure in generating various webpages that may be displayed to the visitor during the traction. In generating these webpages, the Eye Care Transaction Server 110 may use the transaction data structure as a common source of data on multiple factors that influence options provided for various selectable controls displayed on the webpages. For example, the Eye Care Transaction Server 110 may use the transaction data structure in determining what options to make available for one or more selectable controls displayed on a webpage that can be used by the visitor in selecting a type of lens for eyeglasses the visitor is purchasing through the website. As a specific example, the Eye Care Transaction Server 110 may use data stored in the transaction data structure on the visitor's benefits provided through his or her vision plan to determine which types of lens are covered under the visitor's vision plan and can be provided as options for the one or more selectable controls. In addition, the Eye Care Transaction Server 110 may use the transaction data structure in acquiring data that may otherwise be displayed on a webpage. For example, the Eye Care Transaction Server 110 may acquire data from the transaction data structure such as the cost, coverage, and/or benefit parameters associated with a particular option provided for a selectable control to display along with the option to the visitor.

Further, the Eye Care Transaction Server 110 may collect selections of particular options made by the visitor via the selectable controls displayed on the various webpages during the transaction and recorded the selections in the transaction data structure as state data. The Eye Care Transaction Server 110 may then use the state data in further determining options to provide for other selectable controls. In addition, the Eye Care Transaction Server 110 may use the state data in update other data provided in the transaction data structure and/or displayed on a webpage. For example, the Eye Care Transaction Server 110 may dynamically update the cost, coverage, and/or benefit parameters stored in the transaction data structure based at least in part on state data representing the visitor's selections of options and/or present the visitor with a current and running accounting of the benefits and costs that the visitor has selected and has available based at least in part on the selections of options made thus far. After the visitor has completed selection of the appropriate options that can be used to finalize a purchase of the vision-related product and/or service, the Eye Care Transaction Server 110 may allow the participant to finalize the purchase and/or begin a transaction for one or more subsequent products or services.

Transaction Data Structure

Figure 3:
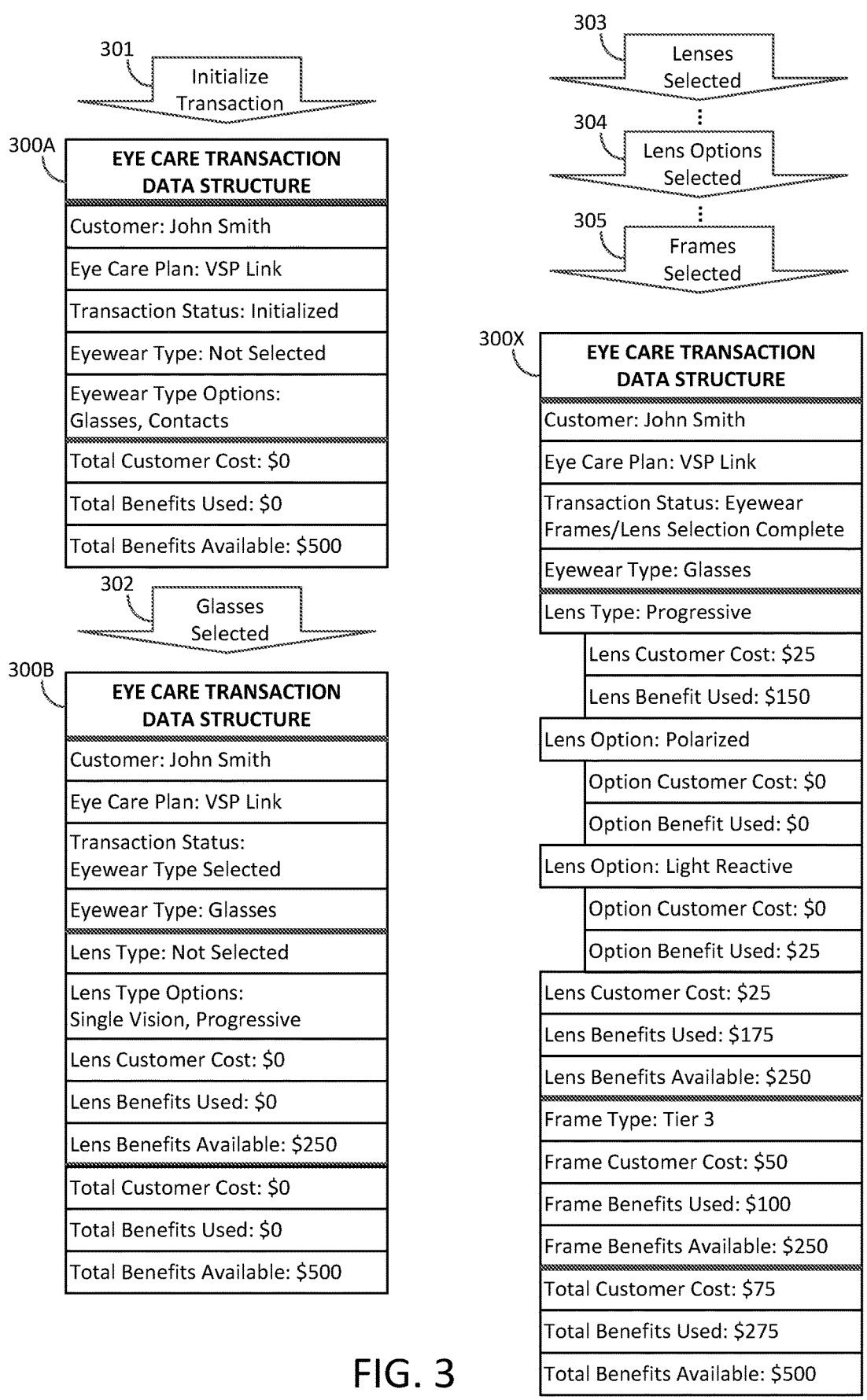
FIG. 3 is a representative diagram of an example of a transaction data structure according to various embodiments.

In various embodiments, the system may use a transaction data structure for storing data used in generating one or more webpages for a website during a transaction with a visitor to the website. FIG. 3 illustrates an example of a Transaction Data Structure 300 that may be used in conducting a purchase of a vision-related product on a website. Accordingly, the system (e.g., the Eye Care Transaction Server 110) may generate, store, modify, and/or supplement the Transaction Data Structure 300 during the transaction involving the visitor purchasing the vision-related product. In response to receiving an indication 301 to initialize a vision-related transaction, the system may collect visitor information and obtain related vision plan information using the collected visitor information. The system may then generate an initial version of the Transaction Data Structure 300A using the initial information received and/or determined for the transaction. For example, as shown in FIG. 3, the initial version of the Transaction Data Structure 300A may include a customer name ("John Smith") for the visitor and a plan identifier ("VSP Link") as provided or selected by the visitor (e.g., via a webpage provided through the website). The initial version of the Transaction Data Structure 300A may also include vision plan parameters that the system determines based at least in part on information provided by the visitor, such as total benefits available to the visitor ("$500") and eyewear type options ("glasses, contacts") available to the visitor. For example, the system (e.g., the Eye Care Transaction Server 110 or the Vision Plan Server 120) may access a source data structure that contains data on the different parameters of the vision plan the visitor is enrolled in for vision coverage. Accordingly, the source data structure can serve as a common source for the system to use in gathering the parameters for the visitor's vision plan. In some embodiments, since the data structure has been initialized, the initial version of the Transaction Data Structure 300A may also contain default information in various fields of the data structure such as, for example, a total cost and/or total benefits used set to "$0," type of eyewear set to "not selected," etc. A state for the transaction may also be indicated as a status set to "initialized" in the initial version of the Transaction Data Structure 300A. In some embodiments, the system may use data found in the initial version of the Transaction Data Structure 300A to generate a webpage that may be presented to the user to facilitate a start to the transaction for the purchase of the vision-related product or service as described herein.

In particular embodiments, the transaction state indicated by the status field may be particularly useful in the event that a transaction is interrupted before completion. In some embodiments, the transaction data structure may be stored for later use if a transaction times out or is otherwise interrupted and/or left incomplete. In such cases, the system may update the transaction data structure to indicate that the transaction ended without completion. Accordingly, the system may detect the visitor returning to the website at a later time and may offer to continue the transaction with the visitor. Here, the system can determine the point where the transaction left off based at least in part on the transaction state stored in the transaction data structure as indicated in the status field. In addition, the system may determine other state data for the transaction such as selections of options already made by the visitor during the previous visit. The system can then resume the transaction with the visitor at that point, thus avoiding having to ask the visitor to repeat the selections made in the visitor's first visit to the website to conduct the transaction.

The system may use the data stored in the transaction data structure in generating various webpages provided during the transaction being conducted through the website. Specifically, the system may use the data stored in the transaction data structure in determining what options to make available for various selectable controls provided on the webpages that the visitor can use in selecting options for various components of the vision-related product or service. As a specific example, the visitor may be conducting the transaction on the website to purchase new eyewear. Therefore, the system may use the data stored in the transaction data structure in generating a first webpage that provides the visitor with one or more first selectable controls to allow the visitor to select a type of vision-related product (e.g., eyewear). Here, the system may use data stored in the transaction data structure indicating parameters defining the benefits the visitor has under his or her vision plan to identify what types of vision-related products are covered under the visitor's vision plan. The system may then generate a webpage for display to the visitor through the website. The webpage may display one or more selectable controls from which the visitor can select a type of eyewear. The system may base the options made available for the one or more selectable controls on the parameters found in the transaction data structure defining the visitor's benefits. For example, the system may determine to provide the eyewear options of eyeglasses, deposable contacts, and reusable contacts for the selectable control.

In response to receiving an indication 302 that the visitor has selected an available option (e.g., eyewear option) for the selectable control, the system may update the initial version of the Transaction Data Structure 300A to an updated version of the Transaction Data Structure 300B to include state data identifying the visitor's selection of eyewear. That is, the system may update and expand the transaction data structure based at least in part on the visitor's selection. For example, as seen in FIG. 3, the system may expand the updated version of the Transaction Data Structure 300B to include or update an eyewear type field to indicate "glasses."

Accordingly, the system may also supplement the updated version of the Transaction Data Structure 300B to include options and/or benefits available based at least in part on the visitor's selection. For example, the system may supplement the updated version of the Transaction Data Structure 300B with source data identifying lens options (e.g., "single vision, progressive,"). In particular embodiments, the system may first determine what lens options are available for the visitor. Here, the system may use one or more parameters found in the transaction data structure defining benefits provided by the visitor's vision plan in determining what lens options to make available to the visitor. For example, a parameter stored in the transaction data structure may indicate the visitor has lens benefits available of "$250."

In some embodiments, the system may use a source data structure that provides source data on the types of lenses that are available through different vision-related product suppliers and/or manufacturers. In other embodiments, the system may retrieve such source data directly through the different vision-related product suppliers and/or manufacturers by, for example, querying Third-Party Servers 160 that are associated with the vision-related product suppliers and/or manufacturers.

The system may then use the one or more parameters found in the transaction data structure and the source data on the types of lenses available from the different vision-related product suppliers and/or manufacturers to determine what lens options to make available to the visitor. For example, the system may identify those lens options available from the different vision-related product suppliers and/or manufacturers that have a cost of $250 or less, or lens options that have a cost within a certain amount of the visitor's benefits such as $300 or less. Once the system has identified the lens options, the system records the lens options in the transactions data structure to generate the updated version of the Transaction Data Structure 300B.

At this point, the system can use the data provided in the updated version of the Transaction Data Structure 300B in generating a second webpage to display to the visitor in further conducting the transaction on the website. The system generates the second webpage to include one or more second selectable controls that provide the lens options as identified in the updated version of the Transaction Data Structure 300B. Therefore, the one or more second selectable controls may provide the visitor with the options of "single vision" and "progressive."

The system may then receive an indication 303 of a selection of a lens option. In turn, the system may update the updated version of the Transaction Data Structure 300B to a newly updated version of the Transaction Data Structure to include state data identifying the visitor's selection of lenses (e.g., the visitor's selection of a particular lens option). In addition, the system may supplement the newly updated version of the Transaction Data Structure to include options to make available for the next component of the eyewear such as, for example, upgrade options for the selected lenses. Again, the system may first determine what upgrade options are available for the lenses selected by the visitor. The system may use one or more parameters found in the transaction data structure defining benefits provided by the visitor's vision plan, as well as the state data indicating the visitor's selection of type of lenses. The system may use a source data structure that provides source data on the different upgrade options that are available for the visitor's selection of type of lenses, or the system may query the source data directly from the different vision-related product manufacturers.

The system may then use the one or more parameters and state data found in the transaction data structure, along with the source data on the upgrade options available from the different vision-related product suppliers and/or manufacturers for the type of lenses selected by the visitor to determine what upgrade options to make available to the visitor for the selected type of lenses. For example, the system may identify the upgrade options "Progressive," "Polarized," and "Light Reactive." Once the system has identified the upgrade options for the selected type of lenses, the system records the upgrade options in the transactions data structure to generate the newly updated version of the Transaction Data Structure. In addition, the system may record and/or update state data in the newly updated version of the Transaction Data Structure for other parameters, features, and/or the like for the transaction. For example, the system may update state data such as total benefits used and/or total customer cost as the transaction progresses and the visitor continues to select options for various components of the eyewear.

The system can then use the data provided in the newly updated version of the Transaction Data Structure in generating a third webpage to display to the visitor in further conducting the transaction on the website. The system generates the third webpage to include one or more third selectable controls that provide the upgrade options for the selected lenses as identified in the newly updated version of the Transaction Data Structure. The system can continue this process for generating further updated versions of the Transaction Data Structure that are used in generating additional webpages to display to the visitor in further conducting the transaction through the website. Accordingly, the system generates these additional webpages to display to the user additional selectable controls to allow the visitor to select further components for the eyewear. Therefore, the system may update, modify, supplement, and/or reduce the transaction data structure as necessary in response to one or more actions (e.g., changes in data states such as selection of options made available via selectable controls and/or identification of options to use for particular selectable controls) that may occur during the transaction After the visitor has completed making selections of the options made available through the various webpages, the system may update and/or modify the final version of the Transaction Data Structure 300X using the visitor's selections and/or vision plan data. For example, as shown in FIG. 3, the final version of the Transaction Data Structure 300X indicates that the visitor has selected progressive lenses with the options of polarization and light reactivity. As can be seen in the example, the state data found in the final version of the Transaction Data Structure 300X indicates the progressive lenses use $150 of the visitor's lens benefits and cost the visitor $25. The final version of the Transaction Data Structure 300X also indicates that the option of polarization is offered at no cost, and so forth.

As shown in this example, the system can use the transaction data structure as a common source for data needed in generating webpages for the website, especially with data stored in the transaction data structure that influences the options provided on the webpages for various selectable controls. In addition, the example demonstrates the system can employ the transaction data structure for storing data related to multiple factors that influence the options provided for various selectable controls. For example, the system uses the transaction data structure in storing parameters related to the visitor's vision plan, options available for various components of the eyewear, and selections of such options, all of which can influence the options provided for any particular selectable controls displayed on a webpage either individually or in combination. Thus, the example demonstrates the system can use the transaction data structure to efficiently and effectively determine what different options to provide for selectable controls displayed on various webpages of the website as the visitor conducts and progresses through the transaction to purchase the eyewear on the website.

Further, the example demonstrates the system can use the transaction data structure in organizing and storing data for the multiple factors that are inter-related with respect to their combined influence on what options are to be provided for the various selectable controls. For example, the transaction data structure includes parameters representing the visitor's benefits provided through his or her vision plan and state data representing different options selected by the visitor for various components of the eyewear. Accordingly, the system can use such data provided in the transaction data structure in generating webpages with selectable controls in which the options provided for the controls are subject to these multiple factors (of which the source data for the multiple factors may have originated from multiple data sources).

Furthermore, the example demonstrates the system can use the transaction data structure to address the dynamic nature of the combination of factors that influence the options provided for various selectable controls that may exist at any given time while the visitor is conducting the transaction on the website. As demonstrated in the example, the transaction data structure can be used to represent various states of the website such as a status of the transaction, selections of various options, accounting of various benefits, and/or the like as the visitor conducts the transaction to purchase the eyewear through the website. Accordingly, the system can utilize the state data provided by the transaction data structure during the generating of webpages in further determining what options to provide for various selectable controls displayed on the webpages.

Dynamic Configuration Module

Figure 4:
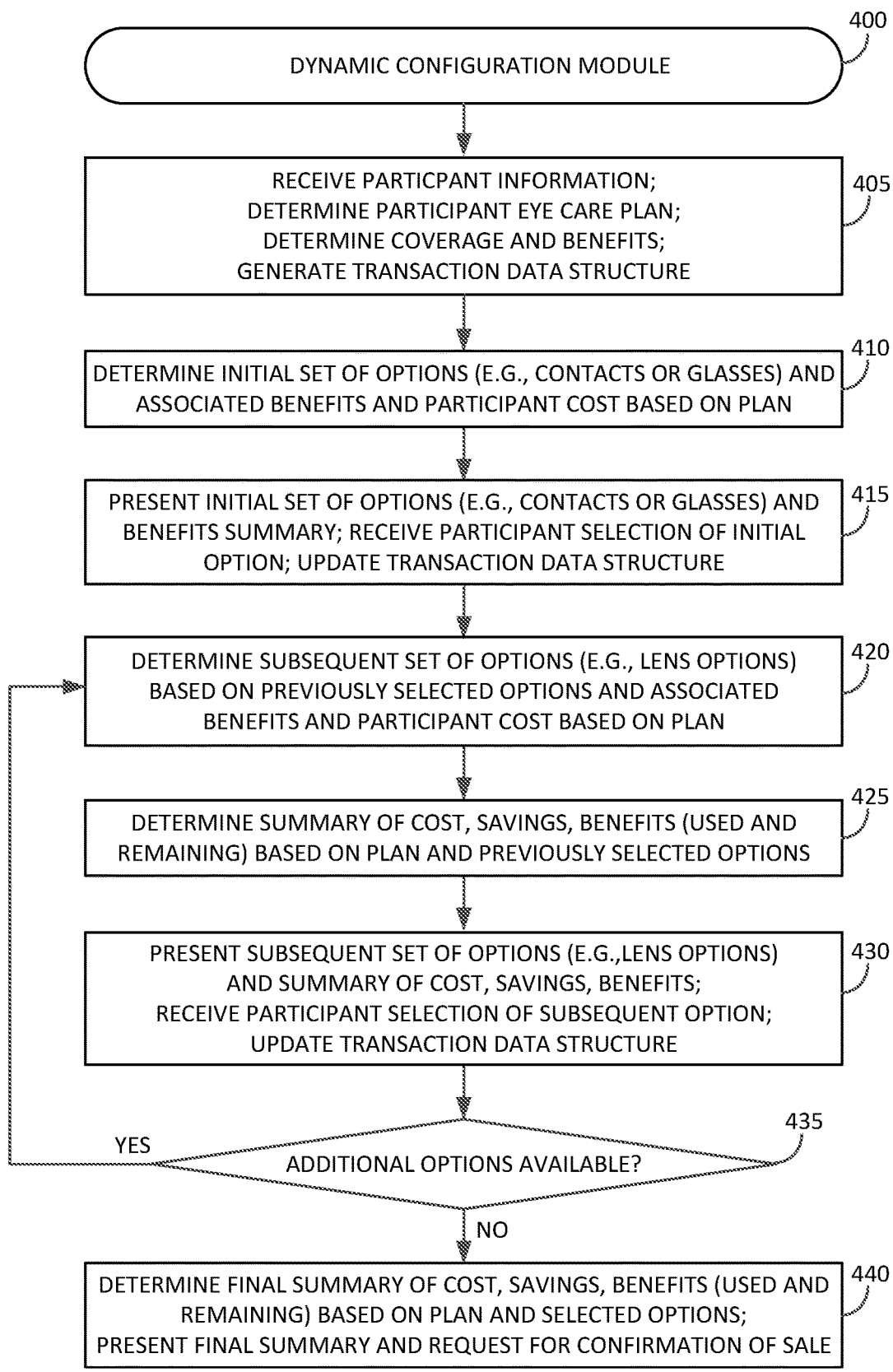
FIG. 4 is a flow chart showing an example of a process performed by a Dynamic Configuration Module according to various embodiments.

FIG. 4 shows an example process performed by a Dynamic Configuration Module 400 configured for generating webpages having selectable controls in which the options provided for the controls can be influenced by multiple factors that are inter-related. The system may execute this module in response to the initiation of a transaction such as a transaction involving the purchase of a vision-related product or service. Accordingly, the Dynamic Configuration Module 400 is discussed in the context of generating webpages that are used in facilitating a transaction involving the purchase of a vision-related product or service. However, the Dynamic Configuration Module 400 may be configured in other embodiments for generating webpages (or other types of graphical user interfaces) used for other types of transactions and/or interactions involving multiple factors that are inter-related. Therefore, the discussion of the Dynamic Configuration Module 400 in the context of generating webpages for use in a transaction involving the purchase of a vision-related product or service should not be viewed as limiting the scope of the invention.

At Step 405, the system may receive initial information that it uses to perform initialization activities for the purchase transaction. For example, the system may receive visitor information such as the visitor's name, social security number, employee identification number, and/or other identifying information (e.g., via a webpage). In addition, the system may receive information on the type of transaction that visitor would like to perform such as purchase of eyewear, optical products, eye care products, and/or the like. The system may also receive information identifying the vision plan in which the visitor participates, or the system may determine the vision plan based at least in part on the visitor identifying information. For example, the system may query a source data structure having data on enrollment of various individuals using the visitor identifying information to determine the vision plan the visitor is enrolled in. In another example, the system may query the Vision Plan Server 120 using the visitor identifying information to determine the vision plan that the visitor is enrolled in. Yet, in another example, the system query one or more vision plan providers (e.g., one or more Third-Party Servers 160 thereof) using the visitor identifying information to solicit what vision plan the visitor is enrolled in. The system may use the plan information to determine the particular benefits and coverage associated with the particular vision plan, the particular type of transaction to be conducted, and/or the particular visitor.

At Step 405, the system also generates a transaction data structure to store data regarding the visitor's transaction. In some embodiments, the system utilizes a transaction template in generating the transaction data structure. For example, the system may select a particular transaction template based at least in part on the type of transaction to be conducted, the visitor, the visitor's vision plan, and/or the like. The transaction template may provide an initial configuration of the transaction data structure. For example, the transaction template may define one or more fields for the transaction data structure. In addition, the transaction template may define default data (e.g., values) for one or more fields.

At Step 410, the system determines an initial set of options (e.g., initial set of optical options, eyewear options, eye care options, etc.) for presenting to the visitor on a webpage that involves a feature, component, and/or the like of the transaction being conducted to purchase the vision-related product or service. For example, the visitor may have initially indicated that he or she would like to purchase eyewear. Therefore, the visitor may need to indicate what type of eyewear (e.g., prescription glasses, prescription sunglasses, contact lenses, and/or the like) he or she would like to purchase before the system can generate the appropriate webpages needed for conducting the transaction. In addition, the system may determine other features, parameters, and/or the like associated with the different types of vision-related products such as, for example, the particular benefits and costs associated with each of the types of vision-related products. The system may update the transaction data structure to reflect the initial set of options, as well as the other features, parameters, and/or the like.

The system generates a webpage displayed to the visitor that includes a selectable control providing options for the types of eyewear that can be purchased through the website. The webpage may be dynamic in that the webpage provided via the website and currently being viewed by the visitor through the visitor's browser application ("browser") executing on a computing device used by the visitor (e.g., laptop computer, desktop computer, tablet, mobile device, and/or the like) may display different content (e.g., selectable controls and/or options for particular selectable controls) at different points of time. Therefore, the system may not necessarily generate and provide an entirely new webpage each time the system "generates" a webpage to display selectable controls providing options and/or other content during the transaction. In some instances, the system may "generate" a webpage to display selectable controls providing options and/or other content during the transaction by changing a portion of a webpage currently being viewed by the visitor without having to load an entirely new webpage in the visitor's browser.

For example, the system may receive data, such as state data indicating a type of transaction to conduct on the website, through a request received from the visitor's browser. In turn, the system may "generate" a webpage by processing the state data to generate content that is specific to the transaction and/or visitor such as a set of options to display for one or more particular selectable controls. The system may then return the content as a reply to the request to the browser. In response, the browser may then change a portion of the webpage currently being viewed by the visitor by processing the content provided in the reply to make the set of options available to the visitor through the one or more particular selectable controls. Therefore, the system has "generated" a webpage to display the one or more particular selectable controls with the set of options by providing content to change a portion of the webpage currently being viewed by the visitor without having to load an entirely new webpage. In other instances, the system may "generate" a webpage by generating an entirely new webpage and providing the new webpage that is then loaded into the visitor's browser.

At Step 415, the system presents the initial set of options to the visitor by making the set of options available through one or more selectable controls currently displayed on a webpage being viewed by the visitor. For instance, the system may have sent content that comprises the set of options to the visitor's browser. In turn, the browser processes the content to display the set of options through the one or more selectable controls displayed on the webpage. Accordingly, the one or more selectable controls are configured to display the options to allow the visitor to select one of more of the options. For example, the one or more selectable controls may a DropDownList that lists all of the options so that the visitor can select one or more of the options. In another example, the one or more selectable controls may be a set of Checkboxes in which each Checkbox is associated with a particular option that the visitor can select from. The system may have included other information along with the options such as, for example, a summary or other indication of the benefits available to the visitor based at least in part on the visitor's plan.

Further, at Step 415, the system detects the visitor's selection of a particular option from among the set of options (e.g., a selection of glasses from the options of prescription glasses, prescription sunglasses, contact lenses, and/or the like). For example, the system may receive state data indicating the visitor's selection of a particular option through a request received from the visitor's browser. Responsive to this selection, the system updates the transaction data structure to include the state data indicating the visitor's selection of the particular option. In addition, the system may update the transaction data structure to reflect other state data for the transaction such as, for example, state data representing a current status of the transaction, state data representing a current accounting of the visitor's benefits provided through his or her vision plan such as amount of the visitor's benefits available to apply to the purchase of the selected option.

Therefore, the transaction data structure is updated so that it may serve as a common source of data for the system on various parameters, features, and/or the like for different aspects involved in the transaction. In this way, the system can use the transaction data structure for tracking multiple factors involved in the transaction that are inter-related with respect to their combined influence on what options may be made available to the visitor for the transaction. That is to say, the system can use the transaction data structure for tracking these multiple factors that data for the factors may originate from multiple sources without necessarily having to gather the data from the multiple sources each time the system needs to determine a set of options to provide for a particular component of the transaction.

At Step 420, the system determines a subsequent set of options for a component involved in the transaction, such as the types of lenses available for the glasses, based at least in part on the selected option and/or on other factors that may influence the subsequent set of options such as, for example, the associated cost for each of the subsequent set of options and the visitor's benefits. Accordingly, some selected options may have particular subsequent options associated with components that are not associated with other options. For example, particular types of lenses may not fit in every type of frame, so in response to the visitor selecting a particular type of lenses, the system may determine and present a set of options for types of frames that only includes those particular types of frames that are capable of being fitted with the selected type of lenses. In particular embodiments, the system may reference a source data structure that includes data on various types of frames that are available. For example, the source data structure may include data on various types of frames that are available from different vision-related product suppliers and/or manufacturers. Therefore, the system can avoid having to query such information from a variety of different data sources to determine the set of options for the types of frames. The system may also determine the cost and available benefit for those particular types of frames. In various embodiments, the system supplements the transaction data structure with this data so that the transaction data structure reflects the set of options.

At Step 425, the system determines and/or updates the transaction data structure to include state data reflecting the total availability and usage of benefits associated with the visitor's plan based at least in part on all the options selected thus far for the purchase of the glasses. The system can then reference this state data in determining sets of options for other components that are then displayed via one or more selectable controls displayed on one or more webpages to the visitor, as well as display the state data itself on these webpages.

At Step 430, the system generates a webpage that includes one or more selectable controls to present the subsequent set of options to the participant and provides the webpage to the visitor accordingly. Here again, the one or more selectable controls allow the visitor to select one of more of the options. The webpage may display other information such as a summary or other indication of the benefits available to the visitor based at least in part on the visitor's plan. The webpage may also display to the visitor a summary or other indication of the total availability and usage of benefits associated with the visitor's plan based at least in part on all the options selected thus far. Also, at Step 430, the system may receive state data indicating the visitor's selection of a particular option from among the set of subsequent options (e.g., a selection of progressive or single vision from the available lens types). Responsive to receiving the state data, the system updates the transaction data structure to reflect the state data. For example, the system may update the transaction data structure to include state data indicating an updated transaction status, as well as state data indicating the selected subsequent option.

At Step 435, the system determines whether there are other components involved in the transaction for which options are to be presented to the visitor. For example, the visitor may not have yet selected upgrade options, or frames to go with selected lenses, etc., and therefore the system may proceed to the next appropriate step in the transaction. Therefore, if the system determines that there are additional options that are to be presented to the visitor, then the system returns to Step 420 to determine one or more sets of options for one or more next components involved in the transaction and generates one or more webpages accordingly to include selectable controls for presenting the subsequent sets of options to the visitor.

However, for example, the visitor may have already selected lenses, frames, and upgrade options for the pair of glasses. Therefore, no other options may be remaining, and the purchase may be in condition for completion. In such case, in various embodiments, the system, at Step 440, determines a final indication or summary of the costs, savings, and benefits used for the visitor and generates a webpage to display to the visitor that presents this information with indications of the selected products and/or services and a user-selectable control allowing the participant to complete the purchase. The system also updates the transaction data structure to include state data that indicates the final product selections, the final costs, savings, and/or benefits information, and to indicate that the purchase transaction is at a purchase confirmation status.

Exemplary User Experience

Figure 5:
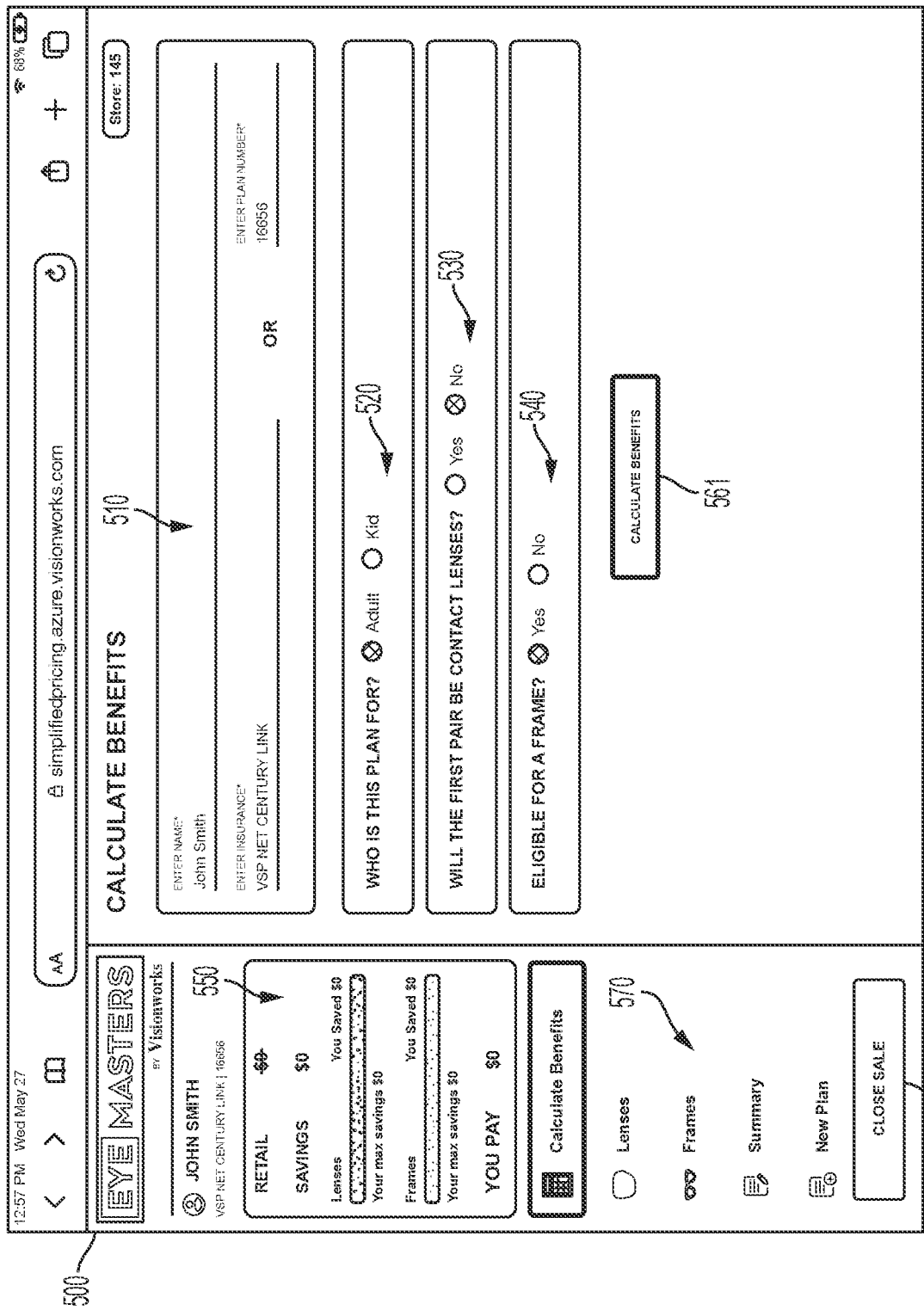
FIG. 5 is an example of a graphical user interface (GUI) that may be configured and generated based at least in part on a transaction data structure according to various embodiments.

FIG. 5 illustrates an example webpage 500 that the system (e.g., the Eye Care Transaction Server 110) may generate to display to a visitor of a website provided for purchasing vision-related products and/or services at the initiation of a transaction involving a purchase of a vision-related product and/or service by the visitor. The webpage 500 may include one or more fields in which the visitor may enter information that the system can then use to determine plan information for the particular visitor, including whether the visitor is an active participant in a vision plan. For example, the webpage 500 may include the visitor information fields 510 that allow the visitor to provide identifying information, such as one or more of the visitor's name, phone number, employee number, employer, social security number, address, etc. In various embodiments, the system uses this information to determine the plan associated with the visitor (if any). Alternatively, or in addition, the visitor information fields 510 may allow the visitor to provide identifying information for a vision plan in which the visitor is a participant, such as one or more of a plan name, a plan number, a group number, etc. The system can use this information to confirm that the visitor is an active plan participant, for example, by querying a data source that may identify plan participants (e.g., a source data structure, the Vision Plan Server 120, One or More Third-Party Servers 160, and/or the like) and update a transaction data structure with state data representing this information.

To further facilitate the transaction, the webpage 500 may include one or more fields to collect further information from the visitor that can allow the system to determine available and/or preferred options to present to the visitor during the transaction. For example, the webpage 500 may include demographic fields 520 that may allow the visitor to indicate, for example, whether the service and/or product requested is for an adult or a child. The webpage 500 may also, or instead, include a product type field 530 that may allow the visitor to indicate a desired product or service type, for example, glasses or contact lenses. The webpage 500 may also, or instead, include an eligibility field 540 that may allow the visitor to indicate an eligibility for a particular product or service, for example, whether the visitor is eligible for a set of frames. Accordingly, the system may update the transaction data structure to include data to reflect the information gathered through these fields.

The webpage 500 may further present plan information to the visitor. For example, the plan information section 550 may include a summary of the benefits available to the visitor, the benefits used, and the cost to the visitor. The system may determine this information based at least in part on the plan data and the particular products, services, and/or options selected by the visitor at this point in the transaction as reflected in the transaction data structure. The webpage 500 may also include an indicator of the transaction status, such as the status indicator 570 that highlights the current position of the visitor in the transaction while also showing (but not highlighting) one or more other positions in the transaction.

The webpage 500 may include one or more selectable controls, such as a calculate benefits control 561 that allows the visitor to request updated benefits information, for example after entering information in one or more of the fields of webpage 500. The webpage 500 may also include a purchase control 562 that allows the visitor to complete the transaction and provide payment or otherwise terminate the transaction.

Figure 6:
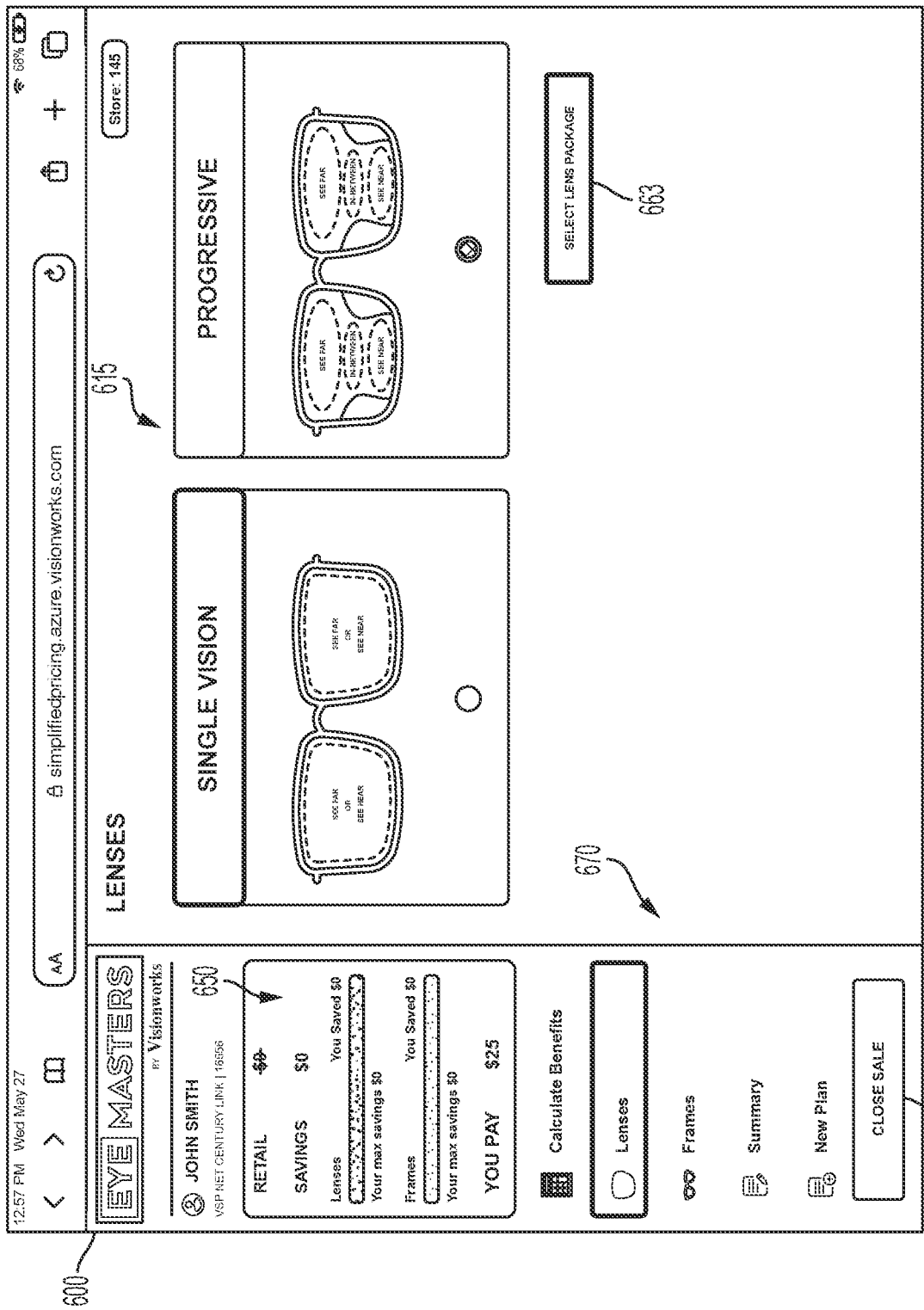
FIG. 6 is another example of a GUI that may be configured and generated based at least in part on a transaction data structure according to various embodiments.

FIG. 6 illustrates an example webpage 600 that the system (e.g., the Eye Care Transaction Server 110) may generate to display on the website to the visitor during the purchase transaction involving the purchase of the vision-related product and/or service. After receiving state data indicating one or more selections and/or information from the visitor (e.g., at the webpage 500 shown in FIG. 5, where the visitor selected glasses as the desired vision-related product), the system may generate the webpage 600 to display to the visitor to request and receive selections of particular options for a particular component of the pair of glasses. The webpage 600 may present the options via one or more selectable controls in the selection section 615, which in FIG. 6 offers the visitor the opportunity to select either single vision or progressive lenses for the pair of glasses being purchased by the visitor in this particular example transaction. The webpage 600 may include an indicator of the transaction status, such as the status indicator 670 that highlights the visitor is at the lenses selection point in the transaction.

The system receives state data indicating the visitor's selection of the type of lenses desired and, in response, may generate a webpage 600 to present an updated plan information section 650 that includes a summary of the benefits available to the visitor, the benefits used, and the cost to the visitor based at least in part on the visitor's selection of a type of lenses. Accordingly, the system may utilize data representing various parameters of the visitor's vision benefits stored in the transaction data structure in generating the webpage. For example, in the webpage shown in FIG. 6, the visitor has selected progressive lenses, which, based at least in part on the visitor's vision plan and as shown in in section 650, will cost the visitor $25, but will not reduce the visitor's total available lens benefit. As can be appreciated, the system is able to determine such information in an efficient, effective, and timely manner by using the transaction data structure as a common data source to store the data representing the various parameters of the visitor's vision plan benefits, as well as data reflecting the visitor's selections of various options and a current accounting of the visitor's benefits. The system may proceed to the next point in the transaction in response to receiving state data indicating the visitor's selection of the control 663, or may close the transaction and/or terminate the transaction in response to detecting the visitor's selected of the control 662.

Figure 7:
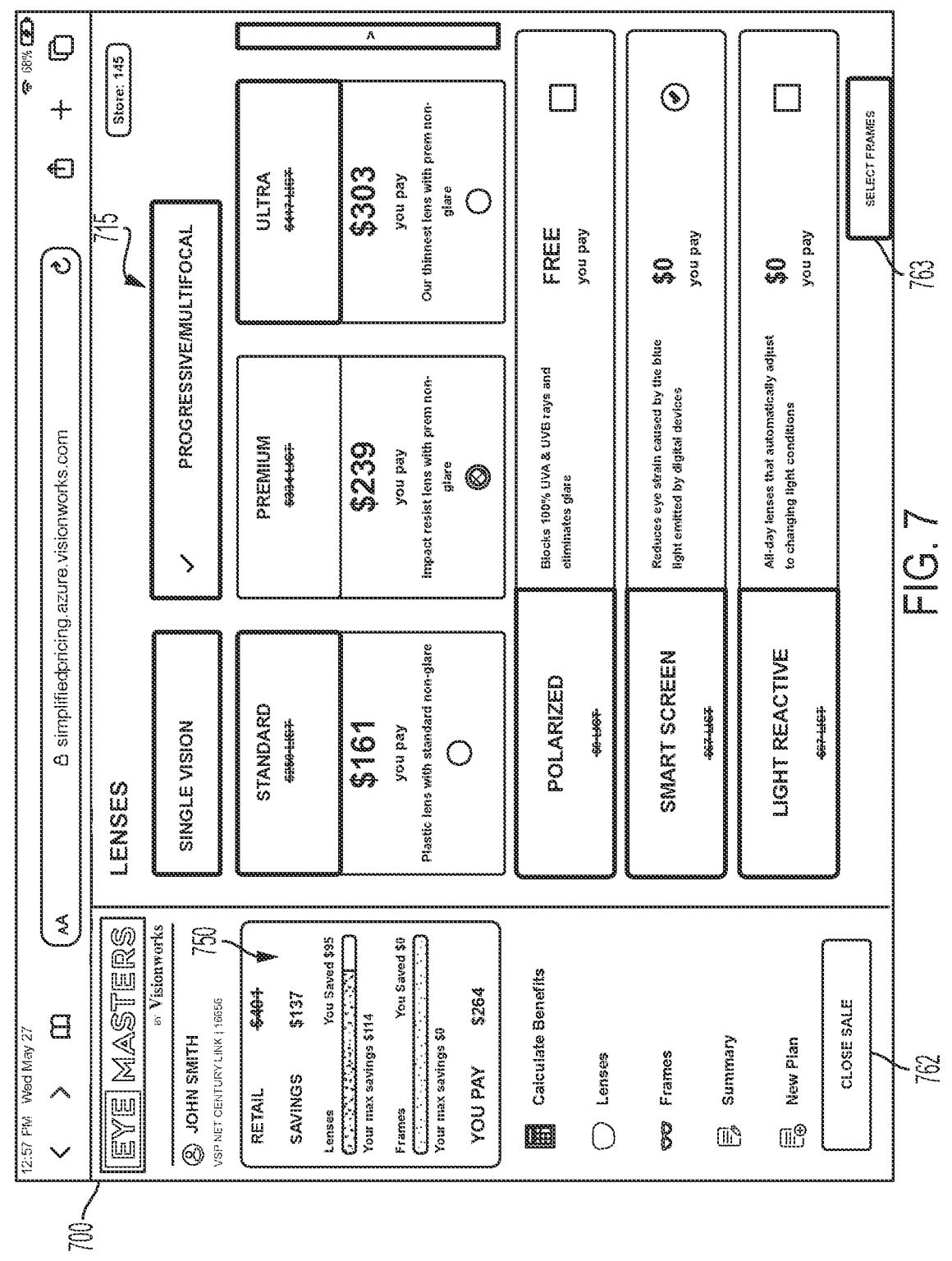

FIG. 7 illustrates another example webpage 700 that the system (e.g., the Eye Care Transaction Server 110) may generate to display on the website to the visitor during the transaction involving the purchase of the vision-related product and/or service. After receiving state data indicating one or more selections and/or information from the visitor (e.g., at the webpage 600 in FIG. 6, where the visitor selected progressive lenses as the desired lens type), the system may generate the webpage 700 to display to the visitor to request and receive selections of additional options for a particular component of the pair of glasses. The webpage 700 may present the available options via one or more selectable controls displayed in the selection section 715, which in FIG. 7 offers the visitor the opportunity to select a quality of lens (e.g., "standard," "premium," or "ultra") and one or more of various lens options (e.g., "polarized," "smart screen," "light reactive").

The system receives state data indicating the visitor's selection of desired lens options and, in response, generates a webpage 700 to present the updated plan information section 750 that includes a summary of the benefits available to the visitor, the benefits used, and the cost to visitor based at least in part on the visitor's selection of lens options. For example, in the webpage 700 shown in FIG. 7, the visitor has selected premium grade lenses and the "smart screen" lens option. In this example, based at least in part on the visitor's vision plan and as shown in section 750, this combination of lenses (participant cost $25) and lens options (participant cost $239) will cost the visitor $264 and will incur a cost of $95 against the visitor's total available lens benefit of $114. Also, as displayed in the section 750, the visitor is saving $95 over the retail cost of the premium lenses ($334).

Again, as can be appreciated, the system is able to determine such information in an efficient, effective, and timely manner by using the transaction data structure as a common data source to store data representing various parameters of the visitor's vision plan benefits, as well as data reflecting the visitor's selections of various options and a current accounting of the visitor's benefits. Accordingly, displaying such updated and running benefit, savings, and cost information on the webpage 700 during the transaction may be very helpful in assisting the visitor in making informed decisions about the use of the visitor's plan benefits. That is say, the system's use of the transaction data structure in generating the webpage 700 to display such information may provide the visitor with an improved experience in conducting the transaction through the website. The system may proceed to the next point in the transaction in response to receiving the state data indicating the visitor's selection of the control 763, or may close the transaction and/or terminate the transaction in response to detecting the visitor's selection of control 762.

Figure 8:
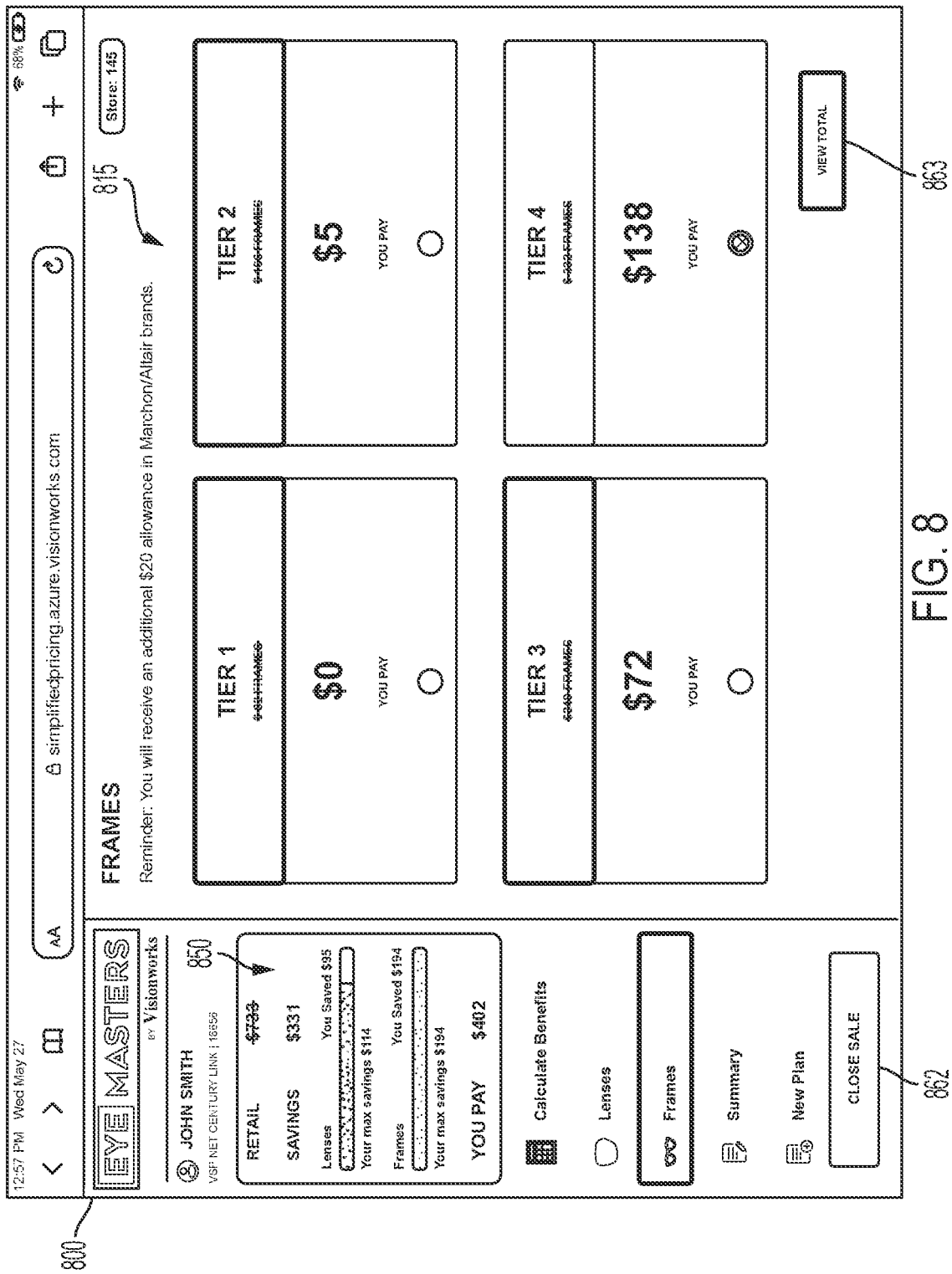
FIG. 8 is another example of a GUI that may be configured and generated based at least in part on a transaction data structure according to various embodiments.

FIG. 8 illustrates another example webpage 800 that the system (e.g., via the Eye Care Transaction Server 110) may generate to display on the website to the visitor during the transaction involving the purchase of the vision-related product and/or service. After receiving state data indicating one or more selections and/or information from the visitor (e.g., such as the webpage 700 in FIG. 7, where the visitor selected various lens options for progressive lenses), the system may generate the webpage 800 to display to the visitor to request and receive selections of additional options for a particular component of the pair of glasses (e.g., frames). The webpage 800 may present the available options via one or more selectable controls in the selection section 815, which in FIG. 8 offers the visitor the opportunity to select a tier of frames (e.g., tier 1, 2, 3, or 4). For example, the system may generate the webpage 800 to display the frames organized into tiers based at least in part on cost or other criteria. As a specific example, the tiers may correspond to a range of frames from least expensive frames to most expensive frames.

The system receives state data indicating the visitor's selection of a desired frame tier and, in response, generates a webpage to present the updated plan information section 850 that includes a summary of the benefits available to the visitor, the benefits used, and the cost to the visitor based at least in part on the visitor's selection of a frame tier. For example, in the webpage 800 shown in FIG. 8, the visitor has selected Tier 4 frames. Continuing with the example, based at least in part on the visitor's vision plan and as shown in in section 850, this combination of frames (cost $138), lenses (cost $25) and lens options (cost $239) will cost the visitor $402 and will incur a cost of $194 against the visitor's total available frame benefit of $194 and a cost of $95 against the visitor's total available lens benefit of $114. Also as displayed in the section 850, the visitor is saving $194 over the retail cost of the Tier 4 frames ($332).

Again, as can be appreciated, the system is able to determine such information in an efficient, effective, and timely manner by using the transaction data structure as a common data source to store data representing various parameters of the visitor's vision plan benefits, as well as data reflecting the visitor's selections of various options and a current accounting of the visitor's benefits. The system may proceed to the next point in the transaction in response to receiving the state data indicating the visitor's selection of the control 863, or may close the transaction and/or terminate the transaction in response to detecting the visitor's selection of the control 862.

FIG. 9 illustrates another example webpage 900 that the system (e.g., via the Eye Care Transaction Server 110) may generate to display on the website to the visitor during the transaction involving the purchase of the vision-related product and/or service. After receiving state data indicating one or more selections and/or information from the visitor, the system may generate the webpage 900 to display a summary of the options selected by the visitor for the particular product or service and the total cost, benefit, and savings. Continuing with the example, the webpage 900 may present a summary section 915 displaying the selected product or service and associated options, which in FIG. 9 represents one pair of glasses with progressive premium lenses, various lens options, and Tier 4 frames. Also shown in the section 915 is the retail cost associated with each component and the respective participant cost, representing the savings the visitor achieved using the vision plan.

The webpage 900 may present a final plan information section 950 that includes a summary of the benefits available to the visitor, the total benefits used for the particular product or service, and the total cost to the visitor for the particular product or service based at least in part on the visitor's selections. For example, in the webpage 900 shown in FIG. 9, the visitor's various selections resulted in a combination of frames (cost $138), lenses (cost $25) and lens options (cost $239) will cost the visitor $402 and will incur a cost of $194 against the visitor's total available frame benefit of $194 and a cost of $95 against the visitor's total available lens benefit of $114. As displayed in section 915, the visitor cost of $402 represents a total savings of $331 over the retail cost of the combination of these options ($733).

Again, as will be appreciated, the system is able to determine such information in an efficient, effective, and timely manner by using the transaction data structure as a common data source to store data representing various parameters of the visitor's vision plan benefits, as well as data reflecting the visitor's selections of various options and a current accounting of the visitor's benefits. The system may close the transaction and complete the transaction in response to receiving the state data indicating the visitor's selection of the control 962. In addition, as shown in FIG. 9, the webpage 900 may facilitate a selection of a subsequent product or service by providing a control 964 that allows the visitor to add another product or service (e.g., in FIG. 9, "add another pair" of glasses). Accordingly, the system may continue to use the same transaction data structure or generate a new transaction data structure for the additional product or service that can reflect a current accounting of the visitor's benefits based at least in part on the purchase of the first product or service.

Figure 10:
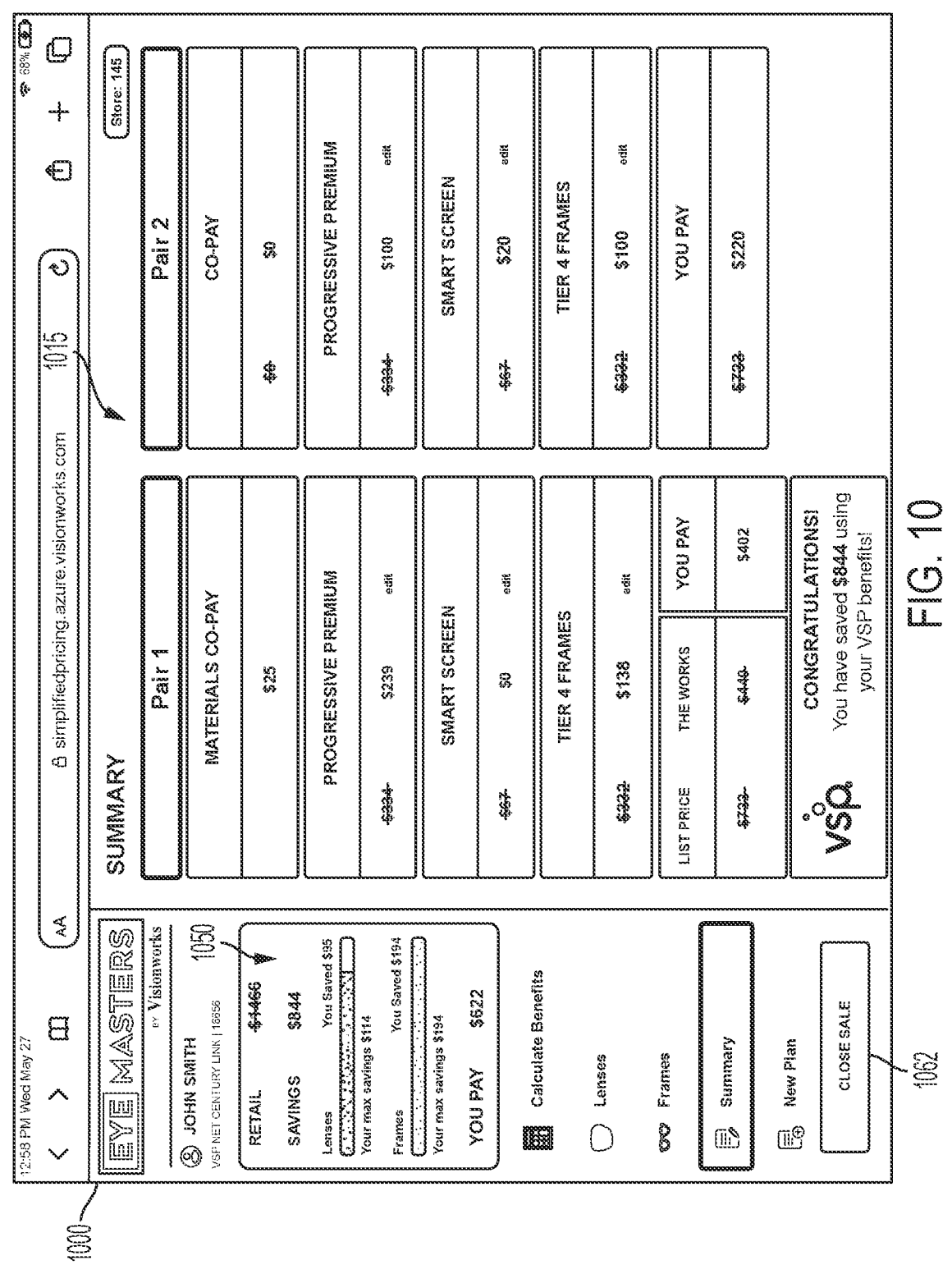

FIG. 10 illustrates another example webpage 1000 that the system (e.g., the Eye Care Transaction Server 110) may generate to present on the website to the visitor summarizing the selection of multiple vision-related products and/or services. After receiving state data on one or more selections and/or information from the participant associated with the purchase of each of the vision-related products and/or services, the system may generate the webpage 1000 to present a summary of the options selected by the visitor for each product or service and the total cost, benefit, and savings. Continuing with the example, the webpage 1000 may present the summary section 1015 displaying the selected products and/or services and associated options, which in FIG. 10 represents two pairs of glasses, each with progressive premium lenses, various lens options, and Tier 4 frames. Also shown in the section 1015 is the retail cost associated with each item and the respective participant cost, representing the savings the visitor achieved using the vision plan. In addition, the summary section 1015 may also display the vision plan associated with the purchase of each of the selected products and/or services and associated options.

The webpage 1000 may present the final plan information section 1050 for the purchase of multiple items that includes a summary of the benefits available to the visitor, the total benefits used for the particular product or service, and the total cost to visitor for the particular product or service based at least in part on the visitor's selections. For example, in the webpage shown in FIG. 10, and continuing with the example, the visitor's various selections resulted in a total cost to the visitor of $622 and used a total of $194 against the visitor's total available frame benefit of $194 and used a total of $95 against the visitor's total available lens benefit of $114. As displayed in the section 1015, the visitor cost of $622 represents a total savings of $844 over the retail cost of these two sets of eyewear ($733 each, for a total retail cost of $1,466). The system may complete the transaction in response to receiving an indication of the visitor's selected of the control 1062.

As noted above, the system may use machine learning (e.g., in conjunction with big data processing techniques) to improve the visitor's experience and/or to accomplish any of a variety of goals, such as maximizing the visitor's use of their benefits, educating the visitor regarding their available benefits, maximizing profitability, maximizing the sale of one or more particular brands and/or types of vision-related products and/or services (e.g., frames, lenses, or coatings). For example, the system may: (1) access a source data structure that includes detailed data from a large number of past vision-related purchase transactions facilitated by the system (e.g., the type and/or brand of eyewear purchased, the type of lenses purchased, the type and/or brand of any lens coatings purchased, purchase price information for the transaction, how much (what percentage) of the visitor's benefits were used during the transaction, etc.); (2) use artificial intelligence to analyze data from the source data structure to identify one or more patterns that indicate that modifying the operation of the system in a particular way would improving progress towards achieving a particular goal (e.g., any of the goals listed above); and (3) automatically modify the operation of the system in the particular way.

In particular embodiments, modifying the operation of the system in the example described above may involve, for example, during any one or more of the steps executed by the system: (1) changing an order in which one or more types of information (e.g., options) are displayed; (2) changing the wording of a particular offer; (3) displaying an offer of a particular type or level of discount; (4) displaying less or more information regarding the transaction or the visitor's benefits; (5) modifying a format of information displayed by the system; and/or (6) displaying information in a particular font.

CONCLUSION

Although embodiments above are described in reference to various systems and methods for calculating cost and benefit parameters for an eye care-related purchase transaction, it should be understood that various aspects of the systems and methods described above may be applicable to other health care-related systems, purchasing systems, or to other types of systems, in general. For example, the functionality described above for obtaining participant selections of various options related to a product or service and the calculation and presentation of costs, benefits, and savings based at least in part on a vision plan may be used within the context of any system that provides defined benefits that can be applied to the purchase of any suitable goods or services.

While this specification contains many specific embodiment details, these should not be construed as limitations on the scope of any invention or of what may be claimed, but rather as descriptions of features that may be specific to particular embodiments of particular inventions. Certain features that are described in this specification in the context of separate embodiments may also be implemented in combination in a single embodiment. Conversely, various features that are described in the context of a single embodiment may also be implemented in multiple embodiments separately and/or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations may be depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Many modifications and other embodiments of the invention will come to mind to one skilled in the art to which this invention pertains having the benefit of the teachings presented in the foregoing descriptions and the associated drawings. While examples discussed above cover the use of various embodiments in the context of calculating cost and benefit parameters for an eye care-related purchase transaction, various embodiments may be used in any other suitable context. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

What is claimed:
1. A method comprising:
receiving, by one or more computer processors, one or more data inputs provided by a website visitor on a first webpage of a website, wherein the website provides an object comprising a first component and a second component;
retrieving, by the one or more computer processors and based at least in part on the one or more data inputs, source data for a benefit option applicable to the website visitor, wherein the source data comprises a benefit value for the website visitor;
retrieving, by the one or more computer processors and based at least in part on the one or more data inputs, first object source data and second object source data from at least one data source, wherein the first object source data is associated with the first component and the second object source data is associated with the second component;
identifying, by the one or more computer processors and based at least in part on the first object source data, a set of first object options for the first component;

generating, by the one or more computer processors, a transaction data structure for the website visitor, wherein generating the transaction data structure comprises:
  populating a first data state field in the transaction data structure with the benefit value; and
  populating one or more first fields of the transaction data structure with the set of first object options;
generating, by the one or more computer processors and based at least in part on the first data state field and the one or more first fields of the transaction data structure, a second webpage comprising at least one first selectable control providing the set of first object options;
providing, by the one or more computer processors, the second webpage for display to the website visitor through the website;
receiving, by the one or more computer processors and originating from the at least one first selectable control, a first selection of a particular first object option of the set of first object options; and
responsive to receiving the first selection:
  generating, by the one or more computer processors and based at least in part on the first selection, a revised benefit value for the website visitor;
  updating, by the one or more computer processors, the first data state field of the transaction data structure to reflect the revised benefit value for the website visitor;
  populating, by the one or more computer processors, a second data state field of the transaction data structure with the first selection;
  identifying, by the one or more computer processors and based at least in part on the second object source data, the revised benefit value, and the second data state field, a set of second object options for the second component;
  populating, by the one or more computer processors, one or more second fields of the transaction data structure with the set of second object options;
  generating, by the one or more computer processors and based at least in part on the one or more second fields of the transaction data structure, a third webpage comprising at least one second selectable control providing the set of second object options; and
  providing, by the one or more computer processors, the third webpage for display to the website visitor through the website.

2. The method of claim 1 further comprising:
receiving, by the one or more computer processors and originating from the at least one second selectable control, a second selection of a particular second object option of the set of second object options; and
responsive to receiving the second selection:
  generating, by the one or more computer processors and based at least in part on the second selection, an updated revised benefit value for the website visitor;
  updating, by the one or more computer processors, the first data state field of the transaction data structure to reflect the updated revised benefit value for the website visitor; and
  populating, by the one or more computer processors, a third data state field of the transaction data structure with the second selection.

3. The method of claim 1, wherein the at least one data source comprises a first source data structure comprising first data on the first component collected from a plurality of third party devices and a second source data structure comprising second data on the second component collected from the plurality of third party devices.

4. The method of claim 1, wherein the transaction data structure is generated based at least in part on a transaction template designed for a type of transaction being conducted by the website visitor on the website.

5. The method of claim 1, wherein generating the transaction data structure for the website visitor further comprises initializing a third data state field in the transaction data structure with an initial cost value, and the method further comprises, responsive to receiving the first selection:
  generating, by the one or more computer processors and based at least in part on the first selection, a revised cost value for the website visitor; and
  updating, by the one or more computer processors, the third data state field of the transaction data structure to reflect the revised cost value for the website visitor.

6. The method of claim 1, wherein generating the transaction data structure for the website visitor further comprises initializing a status field in the transaction data structure with an initial status of a transaction being conducted by the website visitor on the website, and the method further comprises, responsive to receiving the first selection:
  generating, by the one or more computer processors, an updated status of the transaction; and
  updating, by the one or more computer processors, the status field of the transaction data structure to reflect the updated status for the transaction.

7. The method of claim 6, wherein upon displaying the third webpage, an initial visit to the website by the website visitor is interrupted and the method further comprises, upon the website visitor returning to the website:
  generating, by the one or more computer processors and based at least in part on the one or more second fields of the transaction data structure and the status field, a fourth webpage comprising at least one third selectable control providing the set of second object options; and
  providing, by the one or more computer processors, the fourth webpage for display to the website visitor through the website.

8. A system comprising:
a non-transitory computer-readable medium storing instructions; and
a processing device communicatively coupled to the non-transitory computer-readable medium,
wherein, the processing device is configured to execute the instructions and thereby perform operations comprising:
  receiving one or more data inputs provided by a website visitor on a first webpage of a website, wherein the website provides an object comprising a first component and a second component;
  retrieving, based at least in part on the one or more data inputs, source data for a benefit option applicable to the website visitor, wherein the source data comprises a benefit value for the website visitor;
  retrieving, based at least in part on the one or more data inputs, first object source data and second object source data from at least one data source, wherein the first object source data is associated with the first component and the second object source data is associated with the second component;
  identifying, based at least in part on the first object source data, a set of first object options for the first component;

generating a transaction data structure for the website visitor, wherein generating the transaction data structure comprises:
   populating a first data state field in the transaction data structure with the benefit value; and
   populating one or more first fields of the transaction data structure with the set of first object options;
generating, based at least in part on the first data state field and the one or more first fields of the transaction data structure, a second webpage comprising at least one first selectable control providing the set of first object options;
providing the second webpage for display to the website visitor through the website;
receiving, originating from the at least one first selectable control, a first selection of a particular first object option of the set of first object options; and
responsive to receiving the first selection:
   generating, based at least in part on the first selection, a revised benefit value for the website visitor;
   updating the first data state field of the transaction data structure to reflect the revised benefit value for the website visitor;
   populating a second data state field of the transaction data structure with the first selection;
   identifying, based at least in part on the second object source data, the revised benefit value, and the second data state field, a set of second object options for the second component;
   populating one or more second fields of the transaction data structure with the set of second object options;
   generating, based at least in part on the one or more second fields of the transaction data structure, a third webpage comprising at least one second selectable control providing the set of second object options; and
   providing the third webpage for display to the website visitor through the website.

9. The system of claim 8, wherein the operations further comprise:
receiving a second selection of a particular second object option of the set of second object options originating from the at least one second selectable control; and
responsive to receiving the second selection:
   generating, based at least in part on the second selection, an updated revised benefit value for the website visitor;
   updating the first data state field of the transaction data structure to reflect the updated revised benefit value for the website visitor; and
   populating a third data state field of the transaction data structure with the second selection.

10. The system of claim 8, wherein the at least one data source comprises a first source data structure comprising first data on the first component collected from a plurality of third party devices and a second source data structure comprising second data on the second component collected from the plurality of third party devices.

11. The system of claim 8, wherein the transaction data structure is generated based at least in part on a transaction template designed for a type of transaction being conducted by the website visitor on the website.

12. The system of claim 8, wherein generating the transaction data structure for the website visitor further comprises initializing a third data state field in the transaction data structure with an initial cost value, and the operations further comprise, responsive to receiving the first selection:
   generating, based at least in part on the first selection, a revised cost value for the website visitor; and
   updating the third data state field of the transaction data structure to reflect the revised cost value for the website visitor.

13. The system of claim 8, wherein generating the transaction data structure for the website visitor further comprises initializing a status field in the transaction data structure with an initial status of a transaction being conducted by the website visitor on the website, and the operations further comprise, responsive to receiving the first selection:
   generating an updated status of the transaction; and
   updating the status field of the transaction data structure to reflect the updated status for the transaction.

14. The system of claim 13, wherein upon displaying the third webpage, an initial visit to the website by the website visitor is interrupted and the operations further comprise, upon the website visitor returning to the website:
   generating, based at least in part on the one or more second fields of the transaction data structure and the status field, a fourth webpage comprising at least one third selectable control providing the set of second object options; and
   providing the fourth webpage for display to the website visitor through the website.

15. A non-transitory computer-readable medium having program code that is stored thereon, the program code executable by one or more processing devices for performing operations comprising:
receiving one or more data inputs provided by a website visitor on a first webpage of a website, wherein the website provides an object comprising a first component and a second component;
retrieving, based at least in part on the one or more data inputs, source data for a benefit option applicable to the website visitor, wherein the source data comprises a benefit value for the website visitor;
retrieving, based at least in part on the one or more data inputs, first object source data and second object source data from at least one data source, wherein the first object source data is associated with the first component and the second object source data is associated with the second component;
identifying, based at least in part on the first object source data, a set of first object options for the first component;
generating a transaction data structure for the website visitor, wherein generating the transaction data structure comprises:
   populating a first data state field in the transaction data structure with the benefit value; and
   populating one or more first fields of the transaction data structure with the set of first object options;
generating, based at least in part on the first data state field and the one or more first fields of the transaction data structure, a second webpage comprising at least one first selectable control providing the set of first object options;
providing the second webpage for display to the website visitor through the website;
receiving, originating from the at least one first selectable control, a first selection of a particular first object option of the set of first object options; and
responsive to receiving the first selection:
   generating, based at least in part on the first selection, a revised benefit value for the website visitor;

updating the first data state field of the transaction data structure to reflect the revised benefit value for the website visitor;

populating a second data state field of the transaction data structure with the first selection;

identifying, based at least in part on the second object source data, the revised benefit value, and the second data state field, a set of second object options for the second component;

populating one or more second fields of the transaction data structure with the set of second object options;

generating, based at least in part on the one or more second fields of the transaction data structure, a third webpage comprising at least one second selectable control providing the set of second object options; and providing the third webpage for display to the website visitor through the website.

16. The non-transitory computer-readable medium of claim 15, wherein the operations further comprise:

receiving a second selection of a particular second object option of the set of second object options originating from the at least one second selectable control; and responsive to receiving the second selection:

generating, based at least in part on the second selection, an updated revised benefit value for the website visitor;

updating the first data state field of the transaction data structure to reflect the updated revised benefit value for the website visitor; and populating a third data state field of the transaction data structure with the second selection.

17. The non-transitory computer-readable medium of claim 15, wherein the transaction data structure is generated based at least in part on a transaction template designed for a type of transaction being conducted by the website visitor on the website.

18. The non-transitory computer-readable medium of claim 15, wherein generating the transaction data structure for the website visitor further comprises initializing a third data state field in the transaction data structure with an initial cost value, and the operations further comprise, responsive to receiving the first selection:

generating, based at least in part on the first selection, a revised cost value for the website visitor; and updating the third data state field of the transaction data structure to reflect the revised cost value for the website visitor.

19. The non-transitory computer-readable medium of claim 15, wherein generating the transaction data structure for the website visitor further comprises initializing a status field in the transaction data structure with an initial status of a transaction being conducted by the website visitor on the website, and the operations further comprise, responsive to receiving the first selection:

generating an updated status of the transaction; and updating the status field of the transaction data structure to reflect the updated status for the transaction.

20. The non-transitory computer-readable medium of claim 19, wherein upon displaying the third webpage, an initial visit to the website by the website visitor is interrupted and the operations further comprise, upon the website visitor returning to the website:

generating, based at least in part on the one or more second fields of the transaction data structure and the status field, a fourth webpage comprising at least one third selectable control providing the set of second object options; and providing the fourth webpage for display to the website visitor through the website.

* * * * *